March 3, 1970 P. G. GREFE ET AL 3,498,257
APPARATUS FOR TREATING RAZOR BLADES
Original Filed May 19, 1960 12 Sheets-Sheet 1
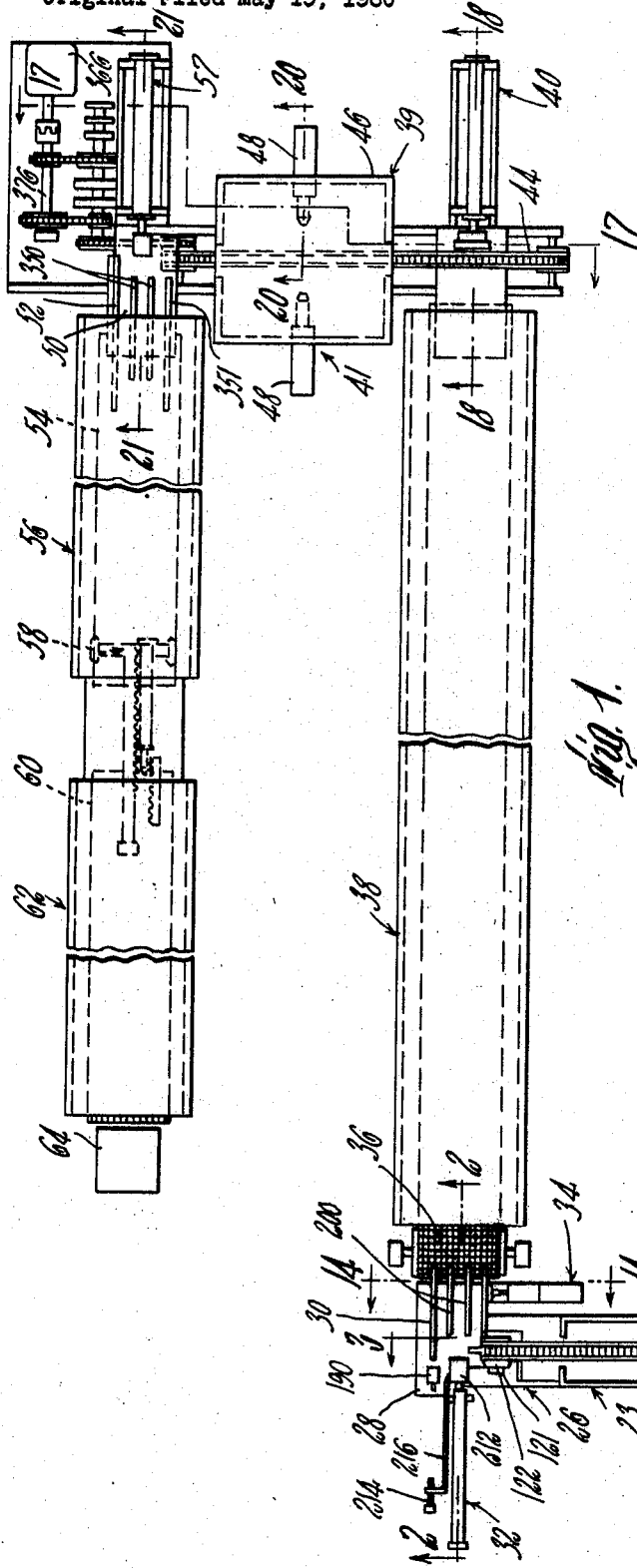
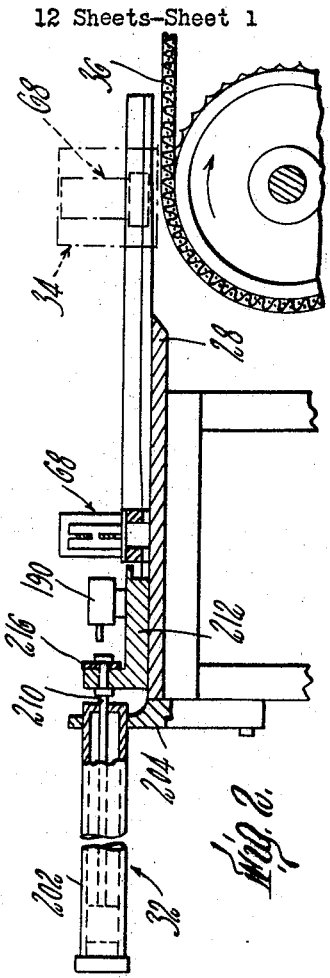
Inventors
Philipp G. Grefe
Edward M. Leviecki
Meyer J. Shnitzer

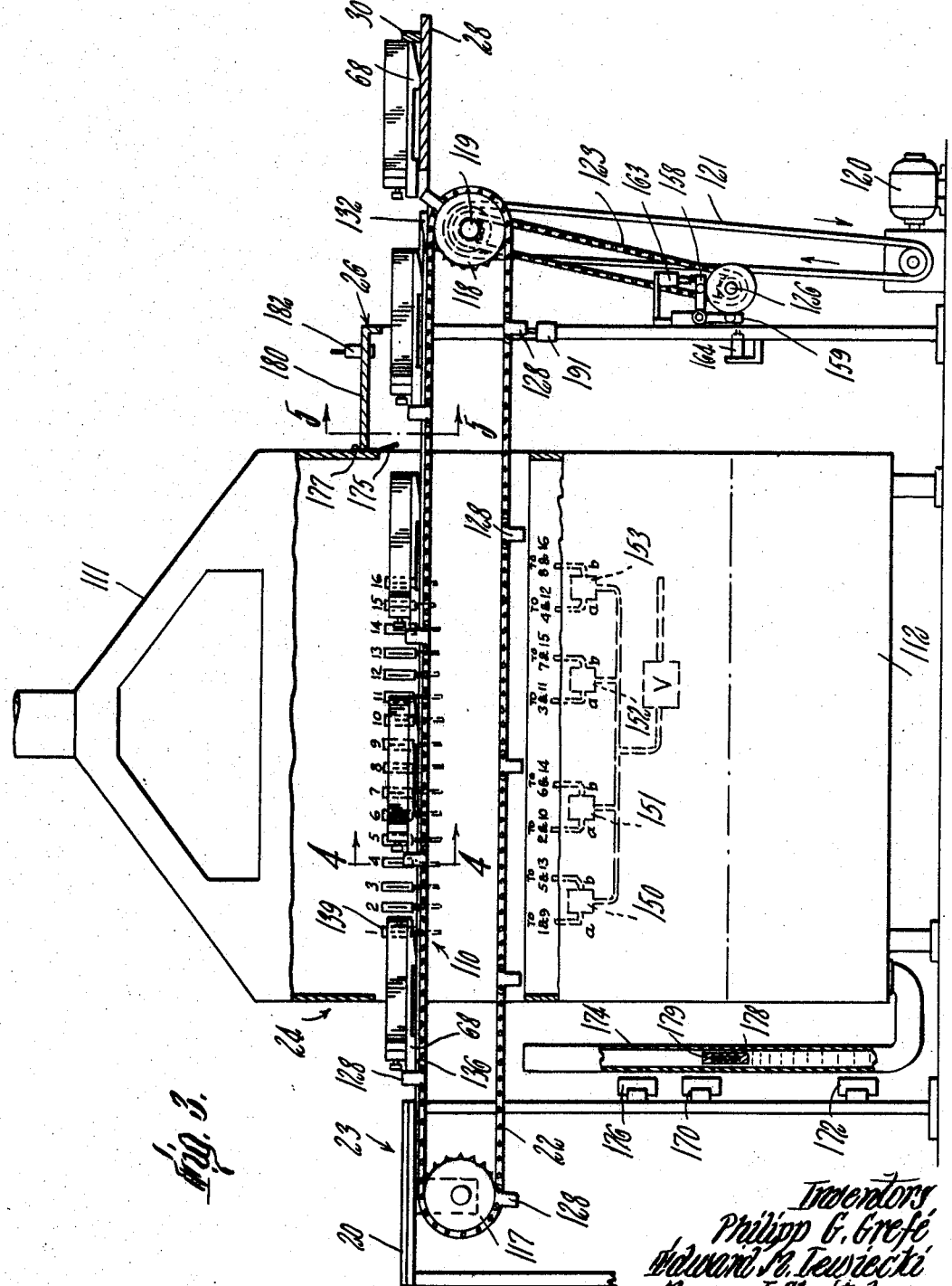

Inventors
Philipp G. Grefe
Edward N. Lewiecki
Meyer J. Shnitzler

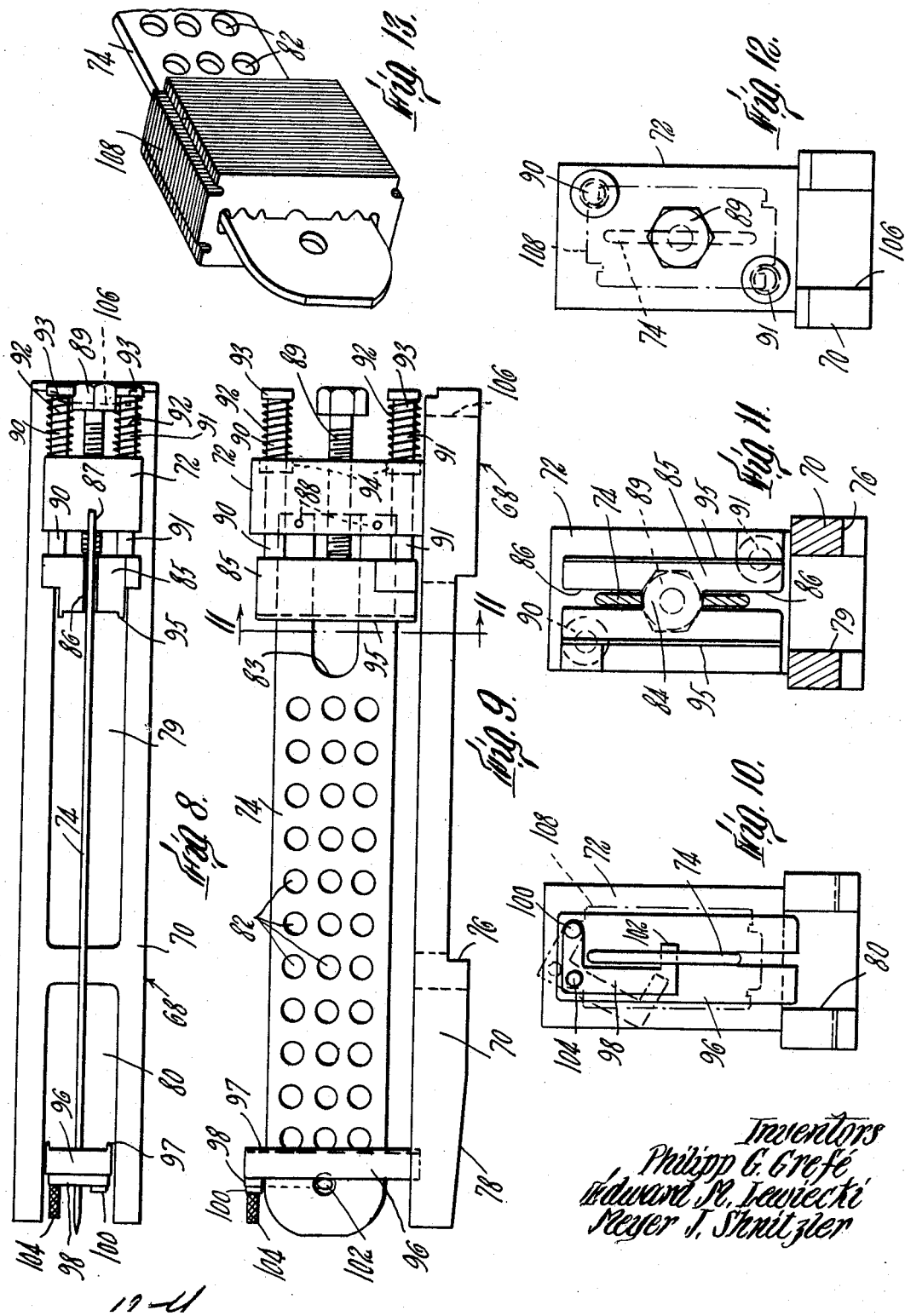

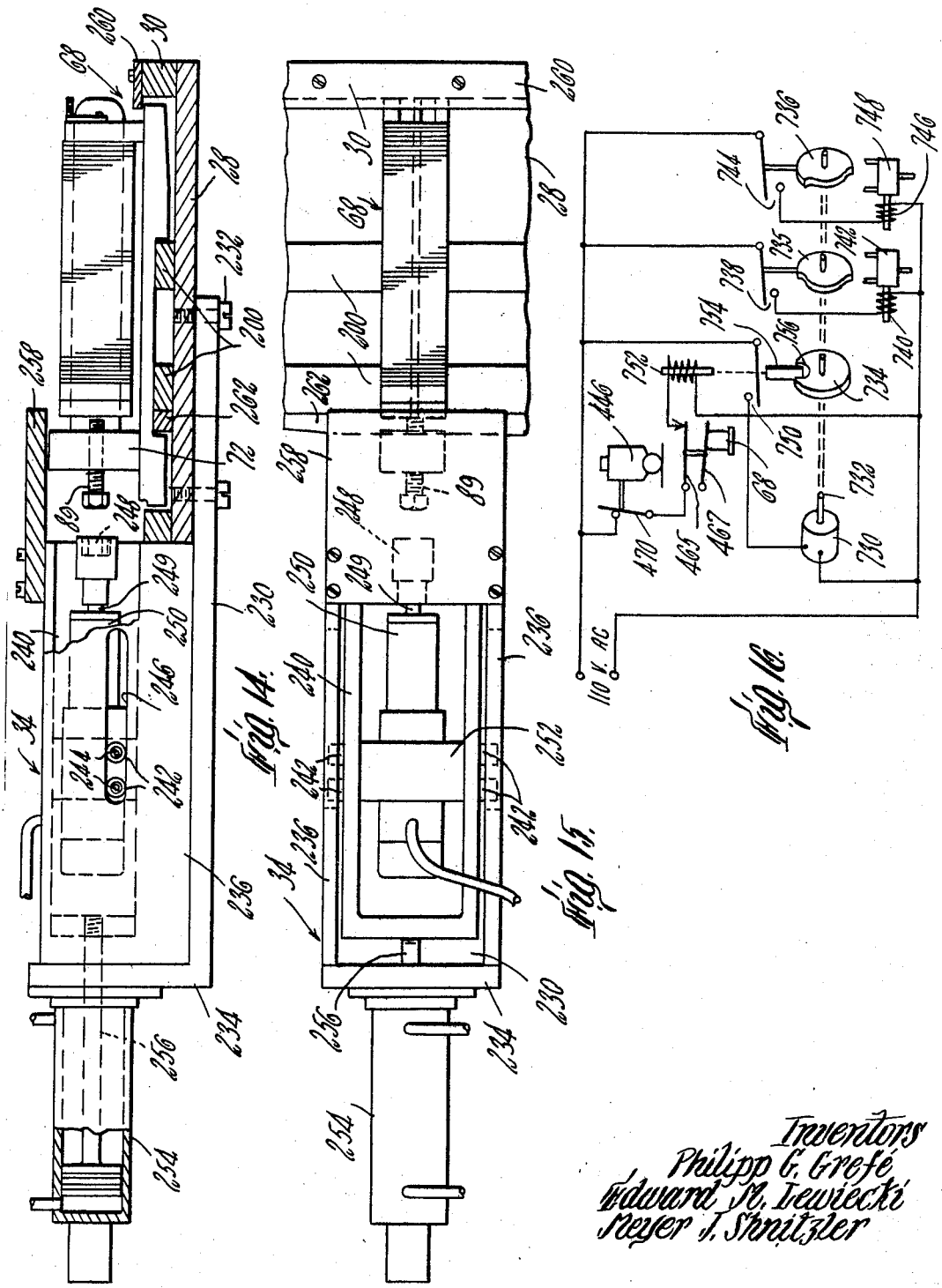

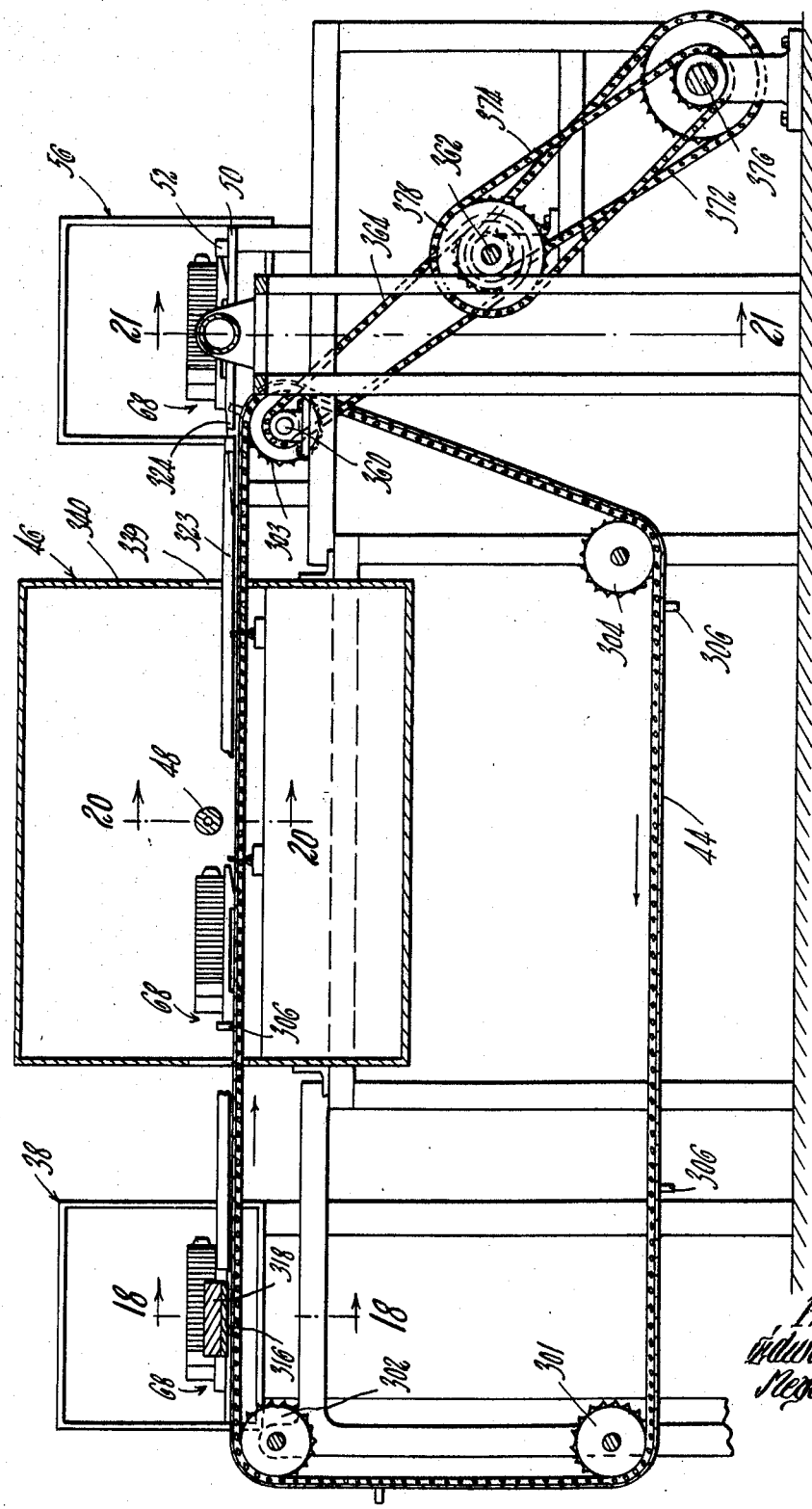

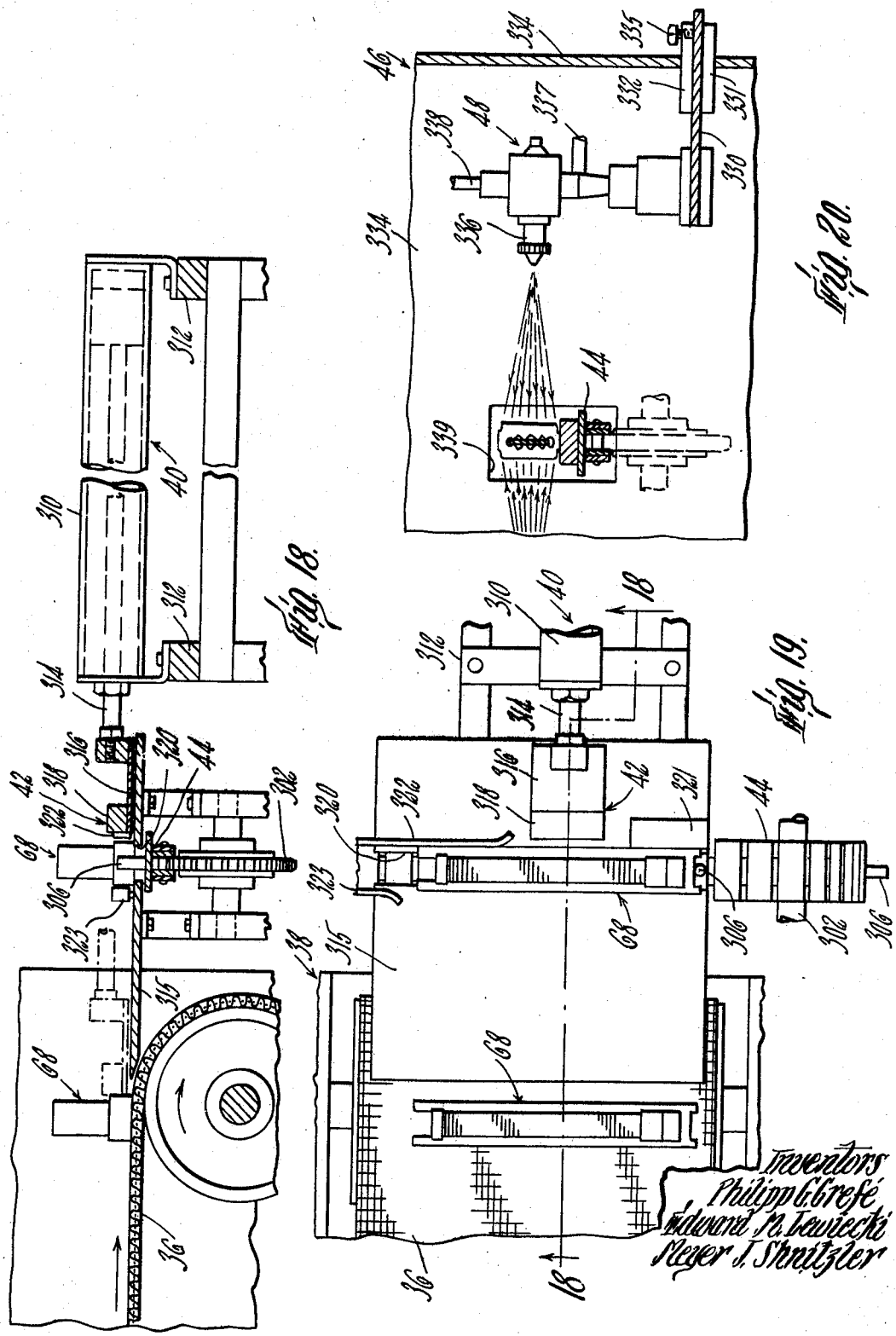

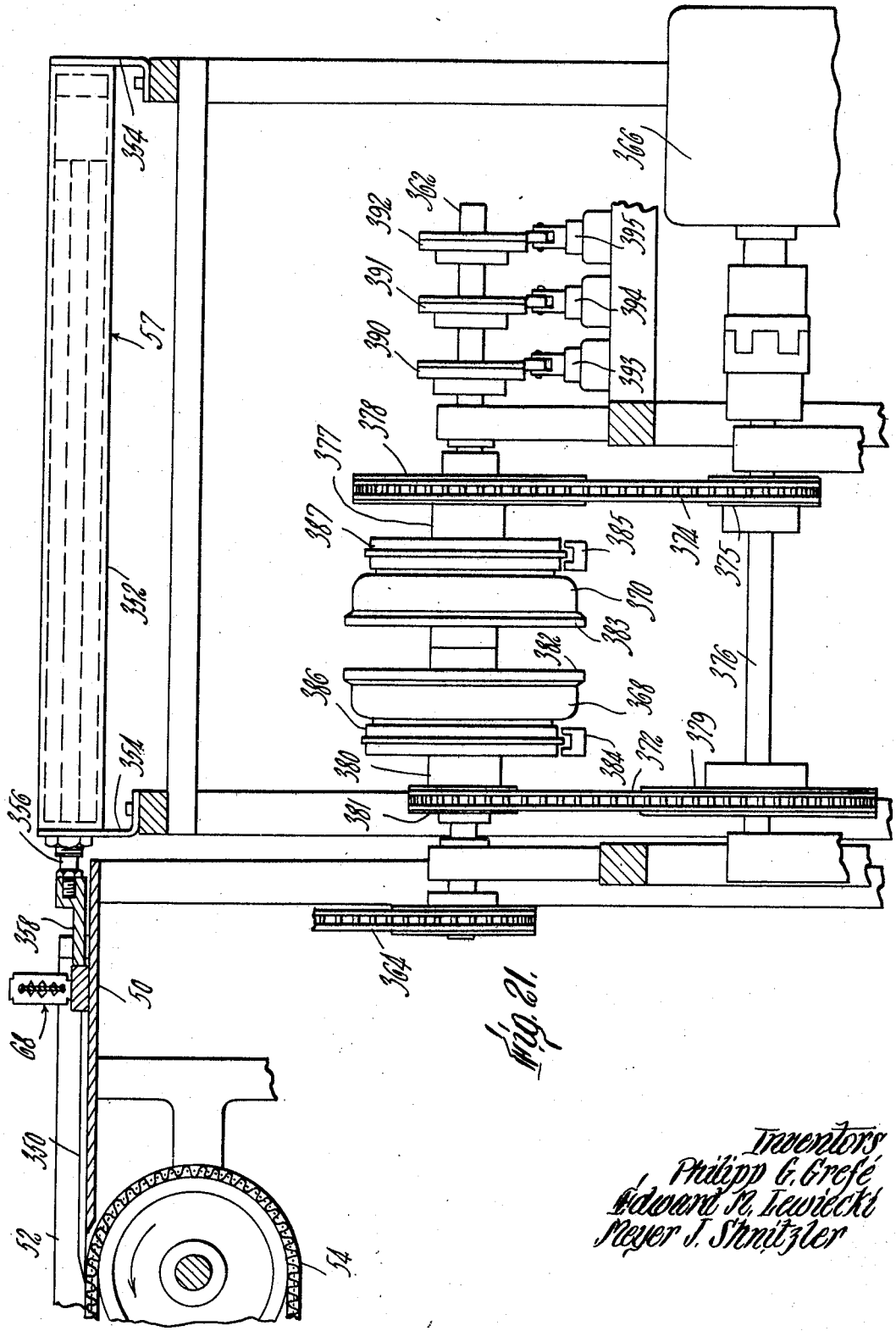

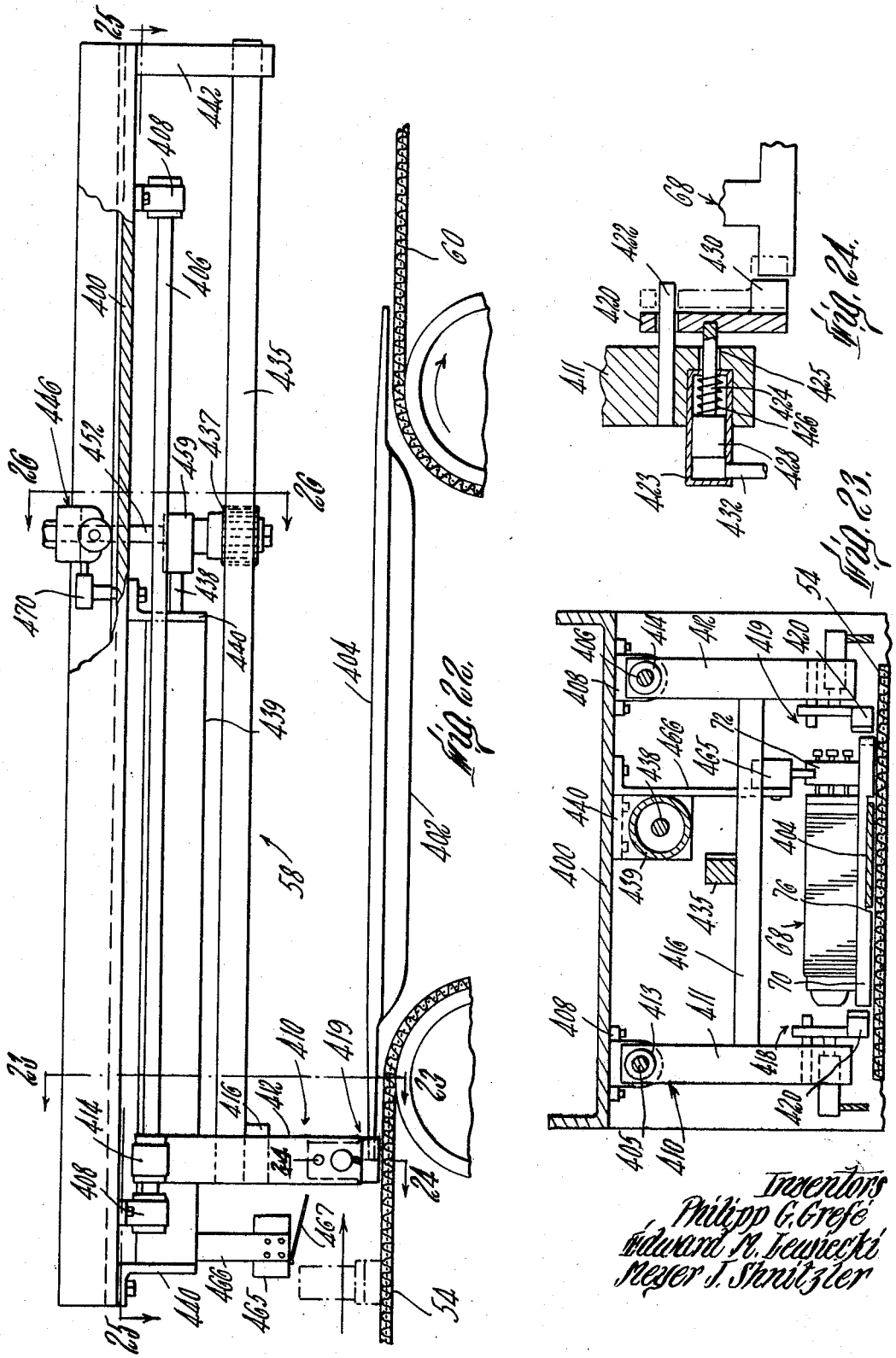

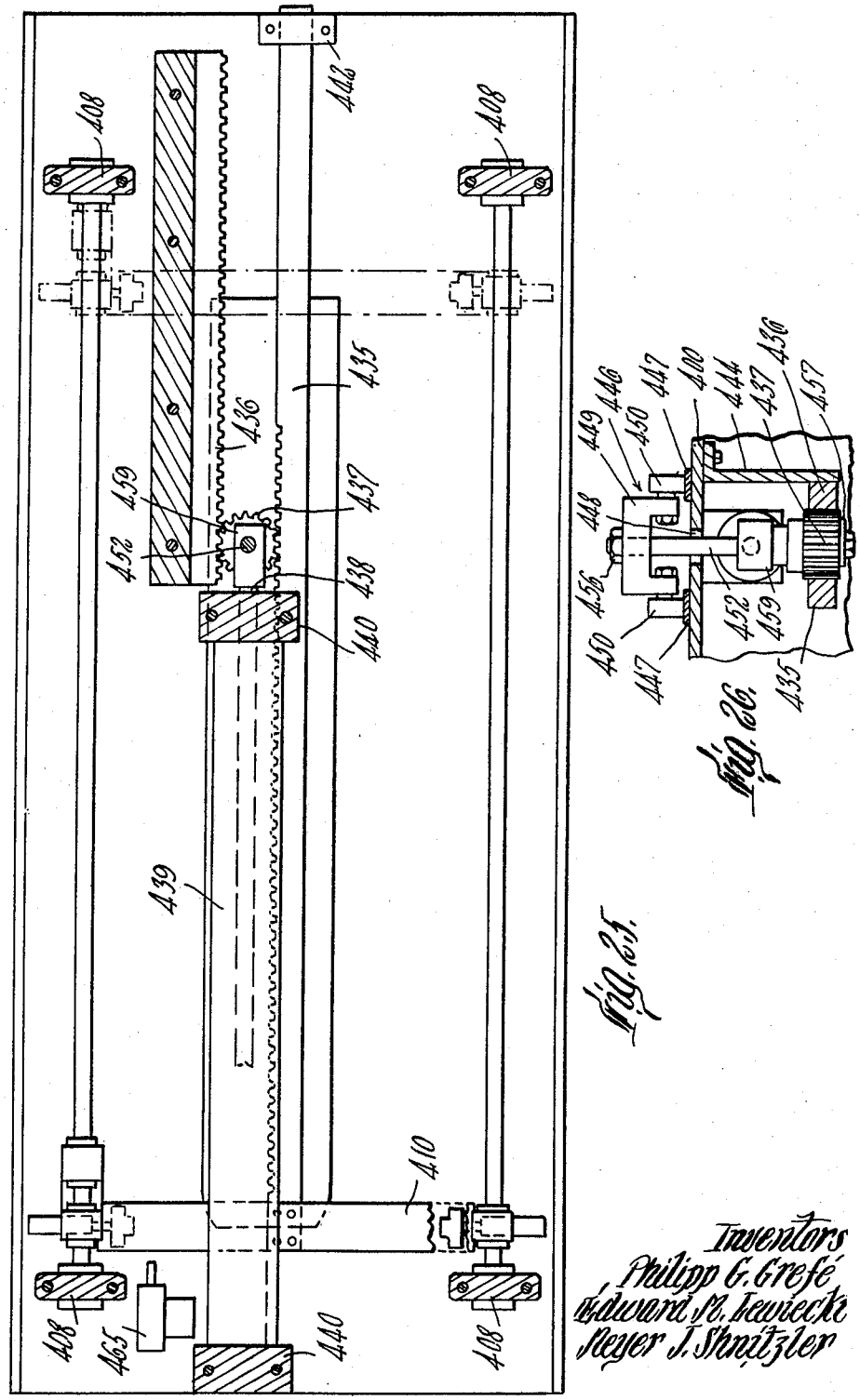

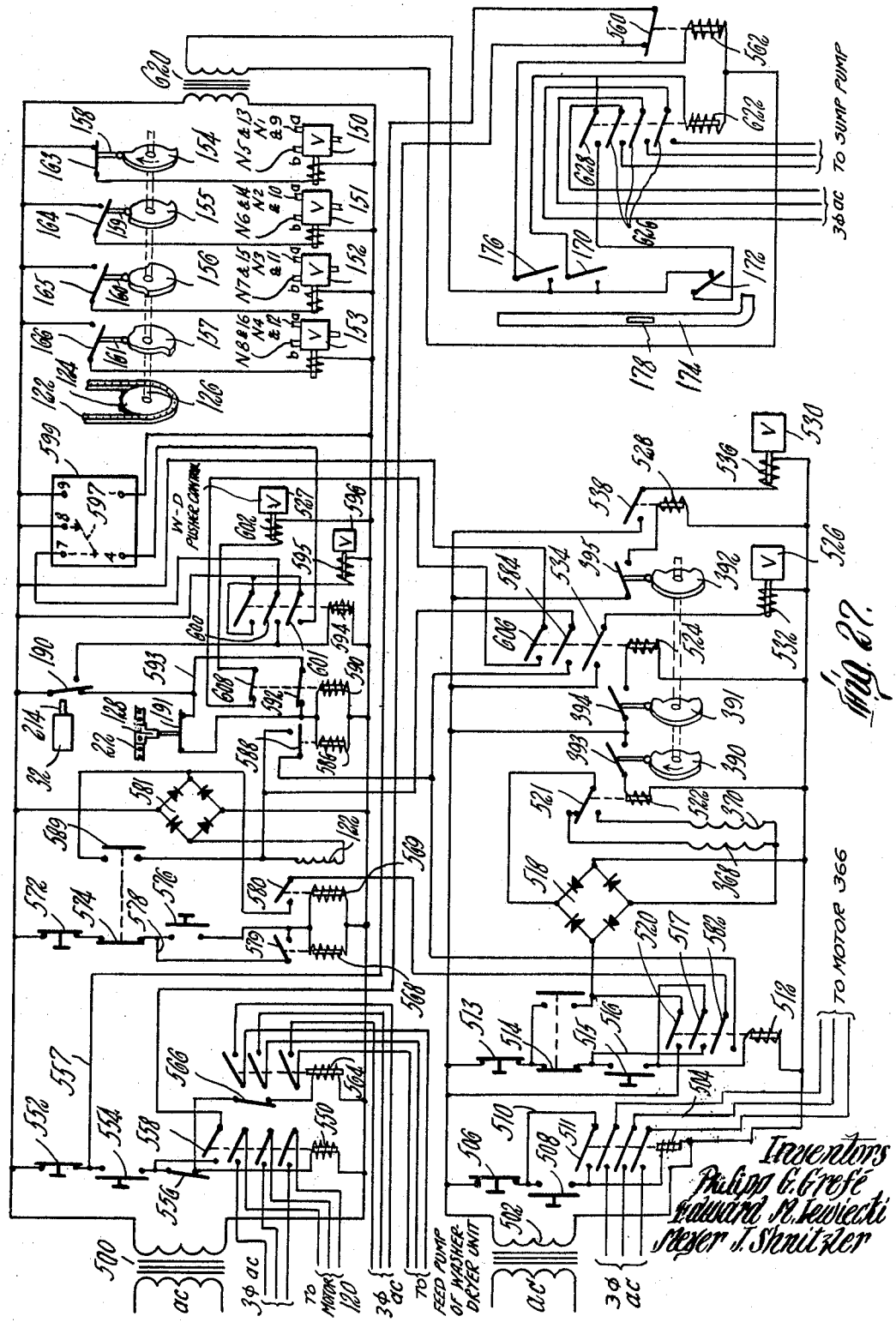

United States Patent Office 3,498,257
Patented Mar. 3, 1970

3,498,257
APPARATUS FOR TREATING RAZOR BLADES
Philipp G. Grefe, Braintree, Edward M. Lewiecki, Hingham, and Meyer J. Shnitzler, Brookline, Mass., assignors to The Gillette Company, Boston, Mass., a corporation of Delaware
Continuation of application Ser. No. 331,080, Dec. 10, 1963, which is a continuation of application Ser. No. 30,265, May 19, 1960. This application Oct. 5, 1964, Ser. No. 403,693
Int. Cl. B05c 7/06, 13/02, 11/00
U.S. Cl. 118—6
20 Claims

ABSTRACT OF THE DISCLOSURE

Apparatus for treating razor blades wherein a stack of razor blades disposed in a holder is successively passed through a blade cleaning unit, a preheater, a spraying unit for depositing a thin coating of shaving facilitating material on the blade edges, a heating unit for curing said material, and a cooling unit. The blades are contained loosely in the blade holder while passing through the cleaning unit to permit them to be thoroughly cleaned and are thereafter clamped together in a compact stack for subsequent treatment. The cleaning unit includes a plurality of nozzles, the operation of which is in timed relationship with the conveyor so that only those nozzles which are opposite specific holder locations on the conveyor emit cleaning fluid.

---

This application is a continuation of our copending application Ser. No. 331,080 filed on Dec. 10, 1963, now abandoned, which in turn is a continuation of application Ser. No. 30,265, filed on May 19, 1960, now abandoned.

This invention relates generally to apparatus for treating razor blades and more particularly to apparatus for manufacturing razor blades having on their cutting edges a soft gel coating that improves the cutting characteristics thereof.

Copending application for Letters Patent Ser. No. 821,623, filed on June 22, 1959, by Granahan et al., now Patent No. 2,937,976 discloses a razor blade with a coated cutting edge, having the characteristics of shaving hair much more easily than blades previously known, and a method of producing such blades. It is a general object of the present invention to provide apparatus for manufacturing razor blades having such a coating.

A further object of the invention is to provide a novel apparatus for coating sharpened edges of razor blades economically and at a rate consistent with present day mass production requirements, capable of operating fully automatically with a minimum of maintenance, and provided with safeguards and controls to permit operation with minimum supervision while assuring a product of high quality and uniformity.

Further and more specific objects of the present invention are apparatus for applying a uniform heat-treatable coating to the sharpened edges of a stack of razor blades and heat-treating such coating to a predetermined state, said apparatus including as aspects thereof means for holding the blades in a stack for processing, cleaning and drying the blades in the stack, clamping the stack of blades, preheating the blades, applying the coating, cooling the stack subsequent to heat-treatment of the coating, and conveying the blade stack through the various units.

The invention accordingly comprises the apparatus possessing the construction, combination of elements and arrangement of parts, which are exemplified in the apparatus and process hereinafter described and illustrated in the accompanying drawings wherein like reference numbers designate like parts, in which:

FIG. 1 is a plan view showing the general layout of the various units of the apparatus embodying the present invention, the individual units being shown in diagrammatic form;

FIG. 2 is an elevational view, partly in section, of a blade holder pusher for transferring blade holders from the washer-dryer unit to the blade holder tightening unit;

FIG. 3 is an elevational view partly in longitudinal section of the washer-dryer unit;

FIG. 8 is a plan view of a blade holder;

FIG. 9 is an elevational side view of the blade holder;

FIG. 10 is an end view of the blade holder as seen from the left of FIG. 9;

FIG. 11 is a sectional view of the blade holder taken one line 11—11 of FIG. 9;

FIG. 12 is an end view of the blade holder as seen from the right of FIG. 9;

FIG. 13 is a fragmentary view of the blade spindle of FIG. 9 holding a stack of double edged razor blades;

FIG. 14 is an elevational view partly in section of the blade holder tightening unit;

FIG. 15 is a plan view of the blade holder tightening unit;

FIG. 16 is a circuit diagram of the electrical circuit that controls the operation of the unit for transferring holders from the heat treatment unit to the cooling unit;

FIG. 17 is an elevational view in longitudinal section of the spraying unit taken along line 17—17 of FIG. 1;

FIG. 18 is an elevational view partly in section of the extractor for transferring blade holders from the preheater to the spraying unit taken along line 18—18 of FIG. 1;

FIG. 19 is a partial plan view of the extractor of FIG. 18.

FIG. 20 is a fragmentary view of one of the spraying nozzles of the spraying unit and of a blade holder disposed in the unit, taken on the line 20—20 of FIG. 1;

FIG. 21 is an elevational view partly in section of the pusher for transferring blade holders from the spraying unit to the heat treatment unit and of the drive mechanism for the conveyor belt of the spraying unit;

FIG. 22 is a view in elevation with a portion broken away of the transfer mechanism for removing blade holders from the conveyor of the heat treatment unit to the conveyor of the cooling unit;

FIG. 23 is a cross sectional view taken on the line 23—23 of FIG. 22;

FIG. 24 is a fragmentary view of one of two holder gripping devices of the transfer unit taken on line 24—24 of FIG. 22;

FIG. 25 is a view of the transfer mechanism taken on line 25—25 of FIG. 22;

FIG. 26 is a fragmentary cross sectional view taken on line 26—26 of FIG. 22;

FIG. 27 is a circuit diagram of the control circuitry of the apparatus; and

GENERAL DESCRIPTION

Figure 6:
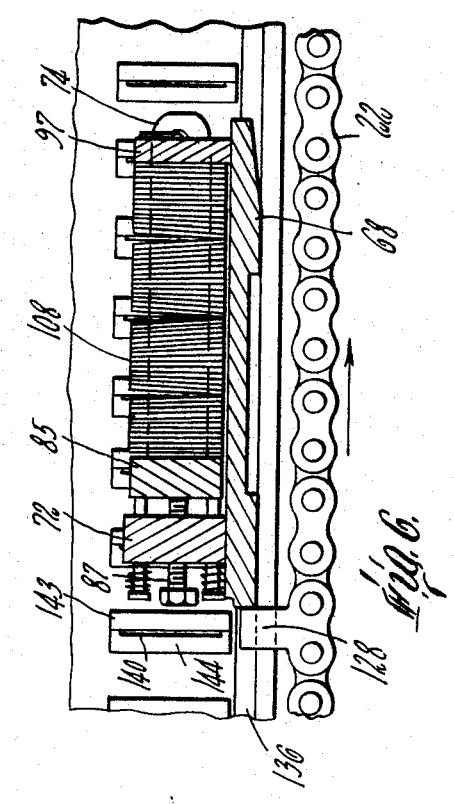
FIG. 6 is a fragmentary view in longitudinal section of the washer section and of a blade holder disposed therein.

The purpose and general mode of operation of the individual units to be described hereinafter more in detail will first be described in connection with the apparatus as a whole schematically illustrated in FIG. 1, which automatically performs the steps of washing a stack of double edged razor blades loosely held in a blade holder; drying the blades in a stream of gaseous fluid which may be air or some other gas; clamping the blades in the stack together with a predetermined pressure; heating the blade stack to a desired temperature; spraying a shaving facilitating heat-treatable or curable material onto the shaving edges of the blades; heating the coated blades at a temperature and for a length of time sufficient to give the coating a desired heat treatment; and cooling the blades to arrest the heat treatment of the coating and to reduce the temperature of the blade holder to a point where it can be manually manipulated.

A blade holder as shown in FIGS. 8 to 13 is manually loaded with blades and placed on a platform 20 (FIG. 1) directly above a conveyor chain 22 which at spaced intervals carries lugs adapted to engage the rear end of the blade holder and push the holder longitudinally through a washer and dryer unit 23 comprising a washer section 24 (FIGS. 3 and 4) and a dryer section 26 (FIGS. 3 and 5) and deposit it on a receiving platform 28 against a backstop and guide member 30.

A transfer or pusher unit 32 (FIG. 2) pushes the holder laterally in front of a blade-holder-tightening unit 34. The blade-holder-tightening unit whose operation is initiated by the final movement of the pusher 32 engages and turns a tightening nut on the blade holder to apply a predetermined pressure to the blade stack.

The holder is displaced toward a chain belt conveyor 36 of a pretreatment unit or preheater 38 by successive blade holders pushed into position in front of the tightening unit 34 and will eventually be pushed off the platform 28 onto the conveyor 36 and carried through the preheater.

A blade holder extractor 40 (FIGS. 18 and 19) of a blade treatment or spraying unit 41 carries a permanent magnet 42 at the end of an extensible arm and is adapted to slide the magnet 42 into the end of the preheating unit against the foremost blade holder carried by the conveyor 36 and latch on to it by magnetic attraction. Near the end of the return stroke of the extensible arm the magnet will deposit the holder in a position above a moving conveyor chain 44 that carries spaced lugs for engaging the holder and push it through a spray booth 46 (FIGS. 17 and 18) between two spray guns 48. The nozzles of the spray guns 48 emit a fine, atomized mist of coating material directed toward the blade edges to deposit a thin uniform coating thereon. The conveyor chain 44 is moved at such a rate of speed when a holder is within the spraying zone of the spray booth that the blade edges are coated to a desired thickness. The blade holder is deposited by the chain conveyor 44 on a receiving platform 50 against a backstop and guide member 52 from where it is pushed onto a chain belt conveyor 54 of a post-treatment or heat treatment unit 56 by a transfer or pusher unit 57.

The speed of the conveyor 54 is such that the holder will remain in the heat treatment unit the requisite length of time to impart to the coating on the blades the desired degree of heat treatment.

A holder transfer unit 58 (FIGS. 22 to 26) grips each holder as it emerges from the heat treatment unit and rapidly slides it along a supporting guide member and places the holder on a chain belt conveyor 60 which carries the holder through a cooling unit 62 which cools the blades and holder and thus arrests further heat treatment of the coating on the blade edges and permits manual handling of the holder. The conveyor 60 deposits the holders on a platform 64 where the blades are manually transferred from the blade holders to blade magazines for storage or for transfer to blade packaging machines.

BLADE HOLDER

A blade holder as shown in FIGS. 8 to 13 may be advantageously used for the purposes of the present invention to support a stack of double edged razor blades horizontally with the center slots of the blades vertically oriented. It is preferred that the blades be held loosely in the holder during the washing and drying steps of the process to permit thorough cleaning and drying of the blades, but it is desirable, although not essential, that the blades be firmly clamped together during the remaining steps of the process. To this end the holder is adapted to support the blades in a position wherein the edges are vertically disposed and fully exposed to a lateral spray and is so constructed as to permit free circulation of air about the blades and includes means for selectively applying clamping pressure to the opposite ends of the blade stack.

As better shown in FIGS. 8 and 9 the blade holder 68 comprises a generally rectangular base 70, a vertically extending bracket 72 rigidly secured to the base near the rear end thereof and a blade supporting spindle 74 extending horizontally forwardly from the bracket centrally of and above the base 70. The bottom of the base 70 is provided with a transverse rectangular recess 76 for receiving guide members for guiding the holder when it is laterally displaced. The forward end of the underside of the base is provided with an upwardly extending bevel 78 for guiding the holder when it is pushed up on a platform as will presently be described. Opening 79 and a forward recess 80 in the base 70 permit free circulation of air from beneath the holder and about the blades mounted on the spindle 74. The forward end of the spindle 74 is rounded off in elevation and is beveled to a dull edge to permit ease of insertion in the central slot of a stack of double edged razor blades. The spindle is provided with a plurality of apertures 82 arranged equidistantly in three straight rows parallel to the sides of the spindle and the rear end thereof is forked to provide a rearwardly extending cutout 83 to receive the central solid portion 84 between longitudinal slots 86 in the top and bottom of a blade clamping member 85. The forked end of the spindle is received within a vertical slot 87 in the front face of the bracket and is rigidly secured thereto as by a pair of dowel pins or rivets 88. The blade clamping member 85 is carried by a pair of vertically and transversely offset horizontal rods 90 and 91 slidably mounted in bores extending through the bracket 72 and rigidly secured to the clamping member. A clamping screw 89 extends through the bracket 72 in threaded engagement therewith and bears against the rear face of the clamping member 85 to move it forwardly. The clamping member 85 is biased rearwardly by springs 92 confined between heads 93 on the rods 90 and 91 and the bottom ends of recesses 94 formed in the rear face of the bracket 72. Vertical marginal flanges 95 extend forwardly from the front face of the blade clamping member 85 for engaging the rearmost blade of the blade stack mounted on the spindle 74 inside the sharpened beveled edges thereof. The spindle 74 is so dimensioned in cross-section that it will be received within the longitudinal slot in a double-edged razor blade without undue play either vertically or laterally. A forked blade retaining member 96 is slidably mounted on the spindle 74 and the rear face thereof is provided with a pair of rearwardly extending marginal flanges 97 spaced and arranged so as to engage the foremost blade of a blade stack mounted on the spindle, like the flanges 95 of the blade clamping member 85 engage the rearmost blade. An L-shaped locking member 98 is swingably mounted about a pivot pin 100 on the front face of the retaining member 96 and carries a locking pin 102 adapted to extend through one of the apertures 82 in the central row to lock the retaining member 96 in position on the spindle 74. A knurled finger grip 104 is secured to and extends forwardly from the locking member 98 which can be swung thereby to the dotted position wherein the retaining member 96 can be removed from the spindle 74 to permit either loading or unloading of blades. The base 70 is provided with a recess 106 in the rear end for receiving pusher lugs or studs carried by the conveyor chains 22 and 44. To load the blades on the holder, the retaining member 96 is removed as described above and the clamping screw 89 is backed off permitting the clamping member 85 to be moved to the right by the return spring 92. A stack of the razor blades 108, FIG. 13, is now slid on the spindle 74 against the flanges 95 of the clamping member 85. The retaining member 96 is placed on the spindle 74 in front of the stack of razor blades and the locking pin 102 is caused to engage the nearest one of the apertures 82 that will leave at least a quarter of an inch between the retaining member 96 and the front end of the blade stack. This will permit the blades to flutter on the spindle under the impact of cleaning fluid spray and the drying air stream to thoroughly clean and dry the blades. The blades are preferably clamped together firmly during the blade coating steps of the process to be described hereinafter and to this end the clamping screw 89 is screwed inwardly thus displacing the clamping member 85 towards the retaining member 96 to apply pressure against the opposite ends of the blade stack.

It should be noted that the sides of the base 70 extend laterally well outside of the edges of the blade so as to protect them against damage if the holder should hit up against some object.

WASHER AND DRYER UNIT

The washer and dryer unit 23 as shown in longitudinal section in FIG. 3 comprises generally the washer section 24 that includes a vapor removing hood 111 and a sump or collecting tank 112, the dryer section 26, and the intermittently moving conveyor chain 22 that extends through the washer and the dryer sections. The conveyor chain 22 runs over an idler sprocket 117 and a driving sprocket 118 rigidly mounted on a shaft 119 driven from a motor 120 through a belt 121 and a clutch 122 (FIG. 1). Also driven from a sprocket mounted on the shaft 119 is a timing chain 123 which drives a cam shaft 126 on which are mounted a plurality of cams (FIG. 7) that control the spraying operation of the washer unit. The conveyor chain 22 carries a plurality of spaced lugs 128 adapted to engage the rear ends of the razor blade holders and push them through the washer and dryer unit.

Figure 4:
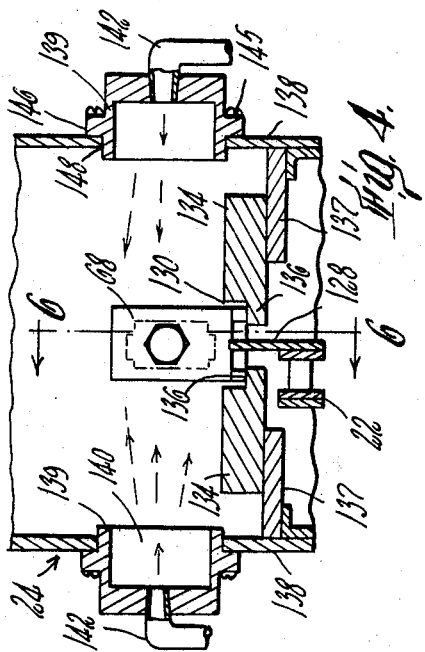
FIG. 4 is a fragmentary view in cross section taken on line 4—4 of FIG. 3 showing the location of the nozzles of the washer section with respect to a blade holder as the latter is transported through the washer section.
Figure 5:
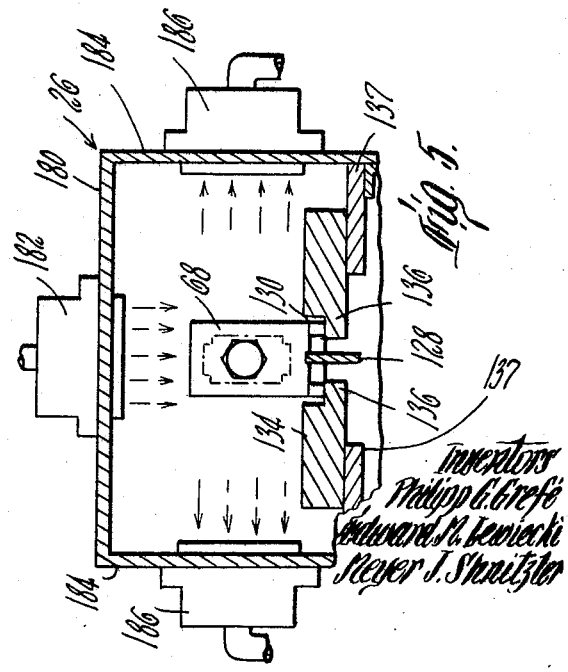
FIG. 5 is a fragmentary view in cross section taken on line 5—5 of FIG. 3 showing the location of the air nozzle and exhaust fixtures with respect to the razor blade holder as the latter is transported through the dryer section.

The razor blade holders 68 are supported in a guideway 130 that extends from the loading platform 20 through the entire length of the washer section and the dryer section and terminate in ramps 132 that guide the blade holders up on the receiving platform 28. Referring to FIG. 4 it will be seen that the guideway is provided by a pair of longitudinally extending members 134 spaced apart so as to receive therebetween the upwardly extending lugs 128 carried by the conveyor chain 22, each of the guide members 134 being formed with an inwardly extending flange 136 for supporting and guiding the blade holders as they are pushed along by the lugs 128 on the conveyor chain 22. The guide members 134 are rigidly supported by and attached to a pair of internal frame members 137 of the unit.

The washer section is provided with side panels 138 in which are mounted a plurality of pairs of spray nozzles 139. In the embodiment illustrated herein there are provided sixteen pairs of spray nozzles 139 so disposed that the blade holders 68 will pass between 16 pairs of nozzles that spray cleaning fluid on the blades in the holders sufficiently forcefully to riffle the blades which, as noted above, are fairly loosely supported on the spindle of the holders, as the holders are carried past the nozzles. The apertures 82 in the spindle 74 of the holders permit the fluid to pass therethrough to augment the cleaning action.

Each nozzle 139 consists of a narrow slit 140 (see FIG. 6) which for standard size double-edged blades may be 4 thousandths of an inch wide and 1⅞ inches high connected to a source of supply of cleaning fluid through a conduit 142 communicating with the rear end of the slit. The nozzles 139 may conveniently be made up in two sections 143 and 144 as indicated in FIG. 6, one section 143 being simply a flat plate and section 144 being formed with a recess of a depth corresponding to the nozzle width desired. The nozzle sections 143 and 144 are rigidly bolted together. The composite nozzles 139 are secured to the side walls 138 by means of attaching screws 145 extending through flanges 146 with the ends of the nozzles extending through openings 148 in the side walls.

In the process described herein the blade holder is designed to hold a stack of blades of approximately 1400 blades and the nozzles 139 are spaced apart by such a distance that the blade stack is in front of four nozzles at all times as the holder is travelling through the washer section. The nozzles 139 are connected to a system of valves 150 to 153 operated in timed relation with the movement of the conveyor chain 22 so that as blade holder enters the washer section, the first pair of nozzles will be turned on and will remain on as long as the blade stack is in front thereof and will turn off as soon as the last blade of the stack has passed it and each of the subsequent pair of nozzles are turned on in a similar manner. Thus, from the time the front blade of the blade stack reaches the nozzle pair 4 and these nozzles are turned on, the four pairs of nozzles directly opposite the blade stack will at all times be turned on as the blade holder passes through the washer section. The operation of the four control valves 150 to 153 is controlled respectively by a plurality of cams 154 to 157 (FIG. 7) on the cam shaft 126, which through cam followers 158 to 161 operate respective microswitches 163 to 166 connected in the actuating circuit for the valves as will be described in connection with FIG. 27.

Each of the valves 150 to 153 is a two position solenoid-operated valve which in one position will direct fluid to one outlet port and in the other position will direct the fluid to the other outlet port. To simplify the description of the operation of the valves 150 to 153 one outlet opening of each will be designated outlet $a$ and the other will be designated outlet $b$ and the valve will be described as being in the $a$ or $b$ position, thus indicating that in one position it will direct fluid flow through outlet $a$ and in the other position it will direct fluid through outlet $b$.

As indicated in FIG. 3 the valve 150 has its outlet $a$ connected to the nozzle pairs 1 and 9 and the outlet $b$ connected to the nozzle pairs 5 and 13. Correspondingly, the valve 151 has outlet $a$ connected to the nozzle pairs 2 and 10 and outlet $b$ to the nozzle pairs 6 and 14; the valve 152 has outlet $a$ connected to the nozzle pairs 3 and 11 and outlet $b$ to the nozzle pairs 7 and 15; and the valve 153 has outlet $a$ connected to the nozzle pairs 4 and 12 and the outlet $b$ to the nozzle pairs 8 and 16.

The timing of the control mechanism for operating the valves 150 to 153 is such that just before the front portion of a stack of blades in a holder enters in front of the nozzle pair 1, the valves 150 to 153 will be in their B positions, that is, with fluid directed to the nozzle pairs 5, 6, 7, 8, 13, 14, 15, and 16. As the front of the blade stack in the holder reaches a position in front of nozzle pair 1 the valve 150 will be actuated to its $a$ position to direct cleaning fluid to nozzle pairs 1 and 9 and will turn off fluid to nozzle pairs 5 and 13. As the front end of the blade stack reaches successively nozzle pairs 2, 3, and 4, the valves 151, 152 and 153 will be actuated to their $a$ positions. It will thus be seen that all the nozzle pairs 1 and 4 will be on simultaneously when the blade stack is in front of them. It should also be noted that nozzle pairs 9 and 12 are also on at this moment. The spacing between the pusher lugs 128 on the conveyor chain 22 is such that the blade holder in front of the one whose advance was just described will be positioned in front of the nozzle pairs 9 to 12. As the front end of the blade holder reaches the nozzle pair 5, valve 150 will be actuated to its *b* position, thus directing cleaning fluid to nozzle pairs 5 and 13 while turning off the fluid to nozzle pairs 1 and 9. Valves 151, 152 and 153 will be operated in sequence as the front end of the stack of blades in the holder reaches nozzle pairs 6, 7, and 8, respectively, and it will be seen that the nozzle pairs 14, 15 and 16, respectively, will be turned at the same time. When the holder reaches nozzle pair 9, the valve 150 will again be actuated to its *a* position so as to turn this nozzle pair on and at the same time turn on nozzle pair 1 to start applying cleaning fluid to the blades on the holder now just entering the washer section. It will be appreciated that the arrangement is such that a number of blades corresponding to two full stacks of blades can be sprayed by cleaning fluid while employing only half of the nozzles at a time and this materially reduces the amount of cleaning fluid needed, which permits the use of pumps, distilling unit and auxiliary equipment of far less capacity than would be needed if all of the nozzles were on simultaneously. There are various types of cleaning fluids suitable for the purpose of the present invention, readily available on the market such as trichloroethylene, mineral spirits and carbon tetrachloride.

Figure 7:
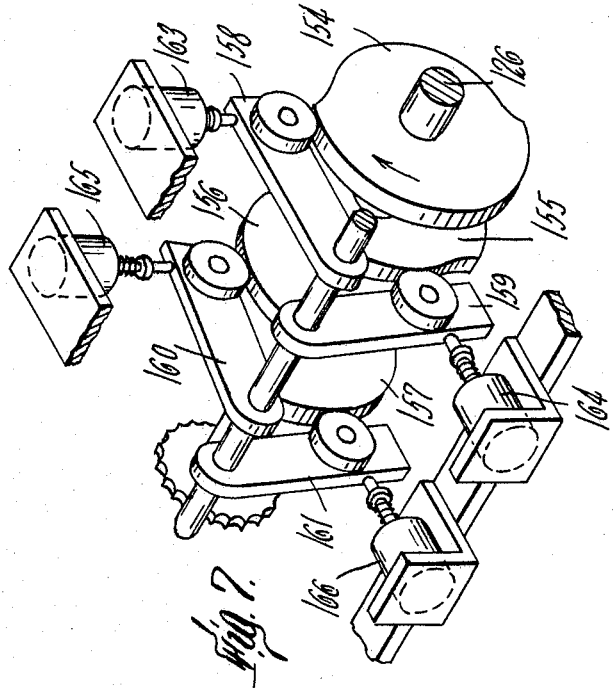
FIG. 7 is a perspective view of the cams, and of the cam followers and switches operated thereby, for controlling the operation of the nozzles of the washer section.

Referring now to FIG. 7 for a description of the control mechanism for operating the valves 150 to 153 in the proper sequence, each of the cams 154 to 157 will, as the cam shaft 126 rotates, maintain its associated microswitch 163 to 166, closed for half a revolution and open during the other half. Each of the valves 150 to 153 has a normal position wherein it will direct fluid through the outlet *b* and an operated position wherein it will direct fluid through the outlet *a*. Thus, as the cam follower is operating on the high portion of the cam as indicated in respect of cam 154 in FIG. 7, it will close the associated microswitch 163 to operate valve 150 to direct a fluid flow to the outlet *a*. The cams 154 to 157 are arranged on the cam shaft 126 with a successive 45 degree displacement. The microswitch of the leading cam is connected to the operating solenoid of the valve 150 and the microswitch of the cam next in line of advancement is connected to the solenoid of the valve 151 and so on to cause the valves 150 to 153 to operate in sequence as the cam shaft 126 is rotated. The cam shaft 126 is operated from the shaft 119 that carries the drive sprocket for the conveyor chain 22 and this mechanical interlock retains indefinitely the desired timed relationship between the operation of the valves and the position of the holders in the washer section.

The hood 111 (FIG. 3) is disposed above the spraying nozzles and a fan blows the cleaning fluid vapors into the atmosphere although they may, if desired, be condensed and returned to the reservoir. The used cleaning fluid is collected by the sump tank 112 directly underneath the spraying nozzles and as the level of used cleaning fluid collected in the tank reaches a predetermined level, a sump pump (not shown) is actuated to pump the exceess fluid to a distillation unit and storage tank (not shown). The control circuit for the sump pump comprises a high limit switch 170 and a low limit switch 172 arranged closely adjacent a fluid standpipe 174 in communication with the tank. A further switch 176 is arranged above the high limit switch 170 and is connected in the main control circuit to shut off the power to the entire washer and dryer unit should the level in the tank for some reason rise above the level at which the high limit switch 170 should start the sump pump to remove fluid from the tank. Switches 170, 172, and 176 may conveniently be of the type that will operate when a magnet is placed in close proximity thereto and to actuate such switches a float 178 which carries a permanent magnet 179 is disposed within the standpipe. As the level of the fluid collected in the sump tank rises, the float 178 will rise with it, and when the float reaches the level of the high limit switch 170 the magnet carried thereby will cause this switch to close and in turn energize the pump motor to pump the fluid from the tank to the distillation unit. As the level of the fluid in the tank drops, the float 178 will drop with it and when it reaches the level of the low limit switch 172 the magnet 179 carried by the float will actuate the switch to turn the pump motor off.

It is noted above that the blades are held on the spindle of the holder 68 fairly loosely so as to permit the blades to move about with respect to each other under the impact of the washing fluid in order to give them a thorough cleaning. For proper operation of the dryer unit, it is desirable that the blades be pushed against the rear end of the holder and spaced from the retaining member 96. To this end there is provided a leaf spring 175 which is attached to the forward end of the wall of the washer section by means of a screw 177. The leaf spring extends downwardly somewhat below the level of the upper ends of the blades and is centered with respect to the blade stack so as to engage the top edges of the blades and push the blades to the rear end of the magazine and then flex so as to pass over the top of the blades and over the projections of the blade holder itself as the latter is pushed into the dryer section 26. The leaf spring 175 will engage only the top edges or other unsharpened portions of the blade and will not come into contact with the sharpened edges thereof.

The dryer section 26 forms an extension of the washer unit and comprises a wall top 180 in which is mounted an air nozzle 182 and side walls 184 (FIG. 5) in which exhaust fixtures 186 are mounted to withdraw the vaporized cleaning fluid blown off the blades and fixture by the air blast from the air nozzle 182. The air nozzle 182 is disposed in the top wall 180 directly above the blade stack as the blade holder passes through the dryer section. The blade stack as it enters the dryer section has been pushed against the rear end of the holder so as to provide a small space, about a quarter of an inch or more between the stack and retaining member 96. The force of the air from the air nozzle 182 forces the blades one by one toward the front of the holder while blowing all remaining cleaning fluid and foreign matter dissolved or suspended therein from the blades and the holder as the latter passes therebetween. The fumes are withdrawn by suction through the exhaust fixtures 186 and are blown into the atmosphere. Because the blast of the drying air from nozzle 182 tends to lower the temperature of the blades, it is desirable that the drying air be heated to a temperature well above the room temperature so that the blade stack when it emerges from the dryer will be above the room temperature to prevent any condensation to form thereon from moisture in the atmosphere.

As the blade holder emerges from the dryer section 26 through an opening in the front wall thereof the holder will be guided up on the platform 28 by the ramps 132 and against the backstop and guide member 30.

A microswitch 191 (FIG. 3) mounted on the frame of the washer and dryer unit in the path of the pusher lugs 128 on the conveyor chain 22 is connected in the operating circuit of the clutch 122 (FIG. 1) to release this clutch and stop the conveyor chain until another cycle of operation is initiated by control circuitry to be described hereinafter.

A pair of guide rails 200 (FIG. 1) are secured to the platform 28 and extend transversely of the direction of movement of the conveyor chain 22. These guide rails 200 are so spaced and dimensioned as to fit within the transverse recess 76 (FIG. 9) of the holder 68 and serve to guide the holder as it is displaced sideways by the pusher 32. The pusher 32 comprises a cylinder 202 (FIG. 2) mounted on a bracket 204 secured to the frame of the washer and dryer unit. Attached to the piston rod 210 of the cylinder 202 is a pusher member 212 travelling between the guide rails 200 and adapted to engage a holder deposited on the platform 28 by the conveyor 22 against the backstop 30 and push it sideways along the guide rails to a position in front of the clamping unit 34 in which position a switch actuating button 214 carried by a bracket 216 attached to the pusher member 212 engages and momentarily operates a microswitch 190. The operation of microswitch 190 causes the pusher unit 32 to be returned to its retracted position, initiates the operation of the blade holder tightening unit 34, and energizes the clutch 122 to cause the conveyor chain 22 to advance through a distance corresponding to the spacing between the pusher lugs 128 and be stopped when the next lug recloses the switch 191 to deenergize the clutch 122.

BLADE HOLDER TIGHTENING UNIT

As mentioned above in connection with the description of the operation of the washer and dryer unit the blades are held fairly loosely on the spindle of the blade holder in order to permit thorough cleaning and drying thereof. However, in the subsequent steps of the process in accordance with the invention described herein it is desirable that the blades be clamped together firmly on the holder. A blade-holder-tightening unit suitable for the purposes of the present invention is shown in FIGS. 14 and 15 and the location thereof with respect to the other units is indicated in FIGS. 1 and 2.

The tightening unit 34 is supported on an L-shaped bracket 230 bolted to the underside of the platform 28 by means of screws 232 and terminating in an upwardly extending flange 234. Side walls 236 of the unit are formed by rectangular plates rigidly secured to the bracket 230. A U-shaped carriage 240 is slidably supported in the side walls 236 by means of a pair of rollers 242 rotatably mounted on studs 244 rigidly secured to each side of the carriage, the rollers being received within elongated, horizontally extending slots 246 in the side walls. The rollers are adapted to roll along the bottom surfaces of the slots 246 to thereby guide and support the carriage 240 as it is moved between the positions shown in FIGS. 14 and 15 and a position wherein a chuck 248 mounted on the drive shaft 249 of a torque motor 250 supported in the carriage is in engagement with the clamping screw 89 of a blade holder 68 disposed in front of the tightening unit.

The motor 250 is supported within and centrally of the carriage 240 by means of a rigid clamping bracket 252 that bridges the arms of the carriage. The carriage 240 is operated by a cylinder 254 rigidly mounted on the flange 234 of the bracket 230. The piston rod 256 of the cylinder extends through an opening in the bracket and is securely attached to the end of the carriage 240 as by a threaded engagement therewith as indicated in FIG. 14. An extension plate 258 is securely attached to the top edges of the side walls 236 and extends forwardly therefrom above the bracket 72 of a holder 68 disposed in the front of the tightening unit. The extension plate 258 cooperates with a strip 260 secured to the top of the backstop 30 and extending over the front end of the base 70 of the holder 68 to prevent the holder from tipping over sideways when tightening pressure is applied to the tightening nut 89. An auxiliary tapering rail 262 is provided on the outside of the rail 200 nearest the tightening unit to guide the holder into proper position and to prevent displacement thereof when the chuck 248 makes initial contact with the clamping screw 89.

In operation, when the holder is in position in front of the tightening unit a source of pressurized air is simultaneously applied to the torque motor 250 to rotate the drive shaft 249 and the chuck 248 carried thereby in a clockwise direction and to the cylinder 254 to move the carriage 240 and the motor 250 to the right as viewed in FIGS. 14 and 15 to a position wherein the clamping screw 89 is received within the chuck 248. After a predetermined time sufficient to apply maximum torque to the clamping screw 89, the air pressure is turned off and the cylinder 254 is returned to its initial position thus releasing the blade holder which will be displaced toward the preheater by the next blade holder pushed in front of the tightening unit.

The circuitry for operating the control valve for the cylinder 254 and the torque motor 250 is shown in FIG. 27 and will be described hereinafter in connection with the operation of the entire apparatus.

PREHEATER

The compacted blade stack and the rather rugged holder add up to a considerable mass of iron (about 4 lbs.) and in order to reduce the time necessary to heat-treat the coating applied to the blade edges and to permit better control of the heat treating process, it is desirable that the blades in the stack when they enter the heat treating unit be at a temperature within or only slightly below the heat treating range of the coating material. To this end the preheater 38 is preferably maintained at a temperature somewhat above the temperature of the heat treating unit but well below a temperature that could adversely affect the sharpened blade edges.

A preheater suitable for the purposes of the present invention may comprise an air oven wherein heated air is circulated over the loaded blade holders supported on the chain belt conveyor 36 within the unit. It has been found that using a commercially available oven wherein the circulated air is maintained at a temperature of 340° F., and the airflow is about 3600 feet per minute, and a belt 36 moving at a rate of speed such that the holder will remain in the oven for approximately 12 minutes, the blades and the holders will attain a temperature of approximately 280° F. by the time they are transferred to the conveyor chain 44 of the spraying unit by the extractor 40. The conveyor 36 may be 13 feet center to center and the oven may extend over 12 feet of the conveyor.

SPRAYING UNIT

The spraying unit 41 is shown in longitudinal section in FIG. 17 and comprises generally the platform chain conveyor 44 which travels over four sprockets 301, 302, 303 and 304 and has holder engaging lugs 306 attached thereto at spaced intervals, the holder extractor 40 (FIGS. 18 and 19), the spray booth 46, the pusher unit 57, and the drive and control devices associated therewith (FIGS. 21 and 24). The blade holders are transferred from the preheater 38 to the conveyor 44 by the extractor 40 and are carried on the conveyor through the spray booth 46 past the pair of oppositely disposed spray guns 48 to the platform 50 from where they are transferred to the heat treating unit 56 by means of the pusher 57.

The extractor 40 as better shown in FIGS. 18 and 19 comprises an air cylinder 310 securely mounted on frame members 312 with the piston rod 314 thereof disposed slightly above the level of a platform 315. Rigidly secured to the end of the piston rod 314 is a magnet holder 316 which at the forward end thereof carries a bar magnet 318. The platform 315 is provided with a transverse slit 320 to receive the pusher lugs 306 carried by the conveyor chain 44. When the air piston 310 is actuated, the piston rod 314 and the magnet holder 316 will be pushed across the platform 315 into the preheater 38 and the permanent magnet 318 will attach itself to the foremost blade holder 68 disposed within the confines of the preheater. The air cylinder will, when returned to its original position, drag this holder laterally across the platform 315 and place it above the conveyor chain 44 in position to be engaged by one of the pusher lugs 306. The operation of the air cylinder 310 is timed with the movements of the conveyor chain 44 so that the forward and return strokes of the piston occur within the spacing between two adjacent pusher lugs 306.

In order to cause the magnet to separate slightly from the blade holder so as to release it, a stop member 321 and a side rail 322 are secured to the platform 315 and disposed to engage the side of the holder when the latter reaches a position straddling the slit 320 slightly before the piston rod 314 of the cylinder reaches the end of its return stroke. The next lug 306 which may simply be a cylindrical rod securely attached to the platform of one of the links of the conveyor chain 44 by a threaded bolt will now engage the rear end of the holder and push it along the platform 315 between the guide rail 322 and a second guide rail 323 which extend in parallel relation through the entire spray booth 46 to the platform 50. The holder will, when it is pushed off the platform 315 rest directly upon the conveyor chain 44 and will be carried thereby into and through the spray booth 46. As the holder reaches the spraying zone in front of the spray guns 48, the speed of the conveyor chain 44 is materially reduced so as to carry the holder and the blades held therein past the two spray guns at a greatly reduced rate of speed to permit an adequate amount of material to be sprayed onto the blade edges. The speed of the conveyor chain 44 is again increased after the last blade of the blade stack on the holder passes the spraying zone and the holder is rapidly carried to the platform 50 onto which it is guided by an inclined ramp 324 (FIG. 17). The holder comes to rest against the end stop and guide member 52 in front of the pusher 57 (FIGS. 1 and 21).

The spray guns 48 may be suitably mounted on a bracket 330 (FIG. 20) slidably received between a pair of blocks 331 and 332 rigidly supported by the side walls 334 of the spray booth. A set screw 335 is provided in the mounting block 332 to maintain the sliding bracket 330 in adjusted position. The nozzles 336 of the spray guns 48 emit a fine atomized spray of the applying material in the form of a cone which at the blade edges should have a base at least as wide as the length of a blade edge. A pneumatic atomizing nozzle as purchased from Spraying Systems Co., Belwood, Illinois, has been found satisfactory for the purposes of the present invention if supplied with the spraying material through a conduit 337 by gravity feed from a head of approximately 4 feet and with pressurized air through a conduit 338 at a rate of flow of approximately 25 feet per minute. The consumption of spraying material has been found to be about 1.66 cc. per minute per gun. The nozzles may be spaced from the blade edges by a distance of approximately 6 inches.

An opening 339 is provided in the forward wall 340 of the spray booth 46 as seen in FIGS. 17 and 20 sufficiently large to permit the blade holders to pass therethrough.

The pusher 57 is operated in timed relationship with the movements of the conveyor chain 44 to push the blade holders 68 from the platform 50 transversely along a pair of guide rails 350 (FIG. 1) received within the recess 76 in the base of the holders and between the end stop 52 and a further guide 351 into the heat treatment unit 56. The rails 350, and the guides 52 and 351, are secured to the platform 50 in parallel relation. The pusher 57 comprises an air cylinder 352 mounted on the main frame by means of a pair of end brackets 354 with the piston rod 356 thereof disposed slightly above the platform 50. Secured to the end of the piston rod 356 is a pusher member 358 adapted to travel between the guide rails 350 (FIG. 1) as it pushes a holder across the platform 50 and onto the chain belt conveyor 54 when the pusher is actuated.

The drive and control mechanism for the conveyor chain 44, the blade holder extractor 40 and the pusher 57 is shown in FIGS. 17 and 21. The conveyor chain 44 is driven from a drive shaft 362 by means of a chain drive 364. The drive shaft 362 is alternately connected to a motor 366 (FIG. 21) through clutches 368 and 370 and respective drive chains 372 and 374. The chain 374 is driven by a sprocket 375 rigidly secured to the motor shaft 376 and, in turn, drives a sprocket 378 rigidly mounted on the hub 377 of the housing of the clutch 370. The relative sizes of the sprockets 375 and 378 are such that the hub 377 will be driven at a reduced rate of speed. The drive chain 372 is driven from a drive sprocket 379 also rigidly connected to the motor shaft 376 and rotates the hub 380 of the housing of the clutch 368 through a driven sprocket 381. The sizes of the drive sprocket 379 and the driven sprocket 381 are such that the hub 380 will be driven at an increased rate of speed. The movable discs 382 and 383 of the clutches 368 and 370, respectively, are rotatively fixed to the shaft 362 but are free to move axially thereon for engaging and disengaging the associated clutch. The clutches 368 and 370 are operated alternately to drive the drive shaft 362 either at a low rate of speed from the drive sprocket 375 or at a high rate of speed from the drive sprocket 379. The clutches 368 and 370 are electrically operated through brushes 384 and 385 suitably mounted on the frame of the machine in sliding contact with slip rings 386 and 387, respectively.

Also mounted on the drive shaft 362 are a plurality of cams 390, 391 and 392 which cooperate, respectively, with microswitches 393, 394 and 395 suitably mounted on the frame of the machine. The microswitch 393 controls the operation of the clutches 368 and 370 and the cam 390 is so formed and adjusted with respect to the positions of the pusher lugs 306 of the conveyor chain 44 that it will close the microswitch 393 to deenergize the clutch 368 and energize the clutch 370 when the foremost blade of the blade stack on a holder 68 pushed by a pusher lug is just entering the spraying zone of the spray guns 48 and hence reduce the speed of rotation of the drive shaft 362 and the rate of travel of the conveyor chain 44. The cam 390 will again open the switch 393 when the last blade of the blade stack of the holder leaves the spraying zone of the guns 48 to deenergize the clutch 370 and energize the clutch 368 to cause the drive shaft 362 to be driven at an increased rate of speed until the next lug 306 on the conveyor chain 44 pushes a holder into the spraying zone of the guns 48.

Cam 391 closes microswitch 394 when a pusher lug 306 has just passed in front of the extractor 40 to actuate the latter and to cause it to extract a holder from the preheater 38 and place it in position above the conveyor chain 44 before the next pusher lug 306 reaches the pick-up position.

Cam 392 closes a microswitch 395 when a pusher lug 306 has placed a holder on the platform 50 in position in front of the pusher 57 to actuate the latter and cause it to push the holder into the heat treatment unit 56 and on the chain belt 54 thereof.

The extractor 40 an the pusher 32 and the conveyor 22 of the washer dryer unit are operated in synchronism. When the microswitch 394 is actuated by the cam 391 to close the operating circuit for the extractor 40 it will at the same time close the energizing circuit for the pusher unit 32 to cause the latter to transfer a blade magazine from the front of the conveyor 22 to a position in front of the holder tightening unit 34 and the energizing circuit of the clutch 122 to cause the conveyor chain 22 to advance one step. A holder will, therefore, be pushed into the preheater only when the extractor operates. This will prevent any build up of holders within the preheating unit while the spraying unit is shut down for some reason.

THE HEAT TREATMENT UNIT

The heat treatment unit 56 may be maintained at about 320° F. and the blades may remain therein for about 10 minutes. With a preheater constructed and operated as described above, the blades will be at about 267° F. when they enter the heat treatment unit and they will leave at about 284° F. The heat treatment unit may be constructed and operated exactly like the preheater described above.

The transfer unit 58 for transferring holders from the exit of the heat treatment unit to the cooling unit 62 will now be described with particular refernce to FIGS. 22 to 26. The transfer unit 58 is supported by a rigid horizontal frame support 400 disposed above the level of the chain belt conveyor 54 of the heat treatment unit and the chain belt conveyor 60 of the cooling unit 62 and is disposed between these units. A platform 402 (FIG. 22) rigidly attached to the frame (not shown) of the apparatus substantially bridges the gap between the conveyor 54 and the conveyor 60 and secured to the top of the platform is a guide rail 404 disposed substantially in line with the center lines of the conveyors 54 and 60 and adapted to be received within the transverse recess 76 in the base 70 of a blade holder 68 to guide the latter as it is displaced from the conveyor 54 to the conveyor 60 by the transfer unit 58. A pair of parallel slide rods 405 and 406 are horizontally supported from the frame support 400 by means of end brackets 408 rigidly secured to the underside of the support and symmetrically straddle the center line of the conveyors 54 and 60. Slidably supported on the slide rods 405 and 406 is a carriage 410 adapted to move from the position shown in full lines in FIG. 25 to the position indicated in dot and dash lines to the right. The carriage 410 comprises a pair of vertical frame members 411 and 412 having rigidly attached to the upper ends thereof respective sleeves 413 and 414 slidably mounted on the slide rods 405 and 406, respectively. A horizontal beam 416 bridges the frame members 411 and 412 and is rigidly secured thereto about midway between the frame support 400 and the guide rail 404. The frame members 411 and 412 carry holder gripping devices 418 and 419, respectively, adapted, when actuated, to clamp the base of a holder therebetween and slide the holder along the guide rail 404 when the carriage 410 is moved. Since the gripping devices 418 and 419 are of identical construction only device 418 carried by the frame member 411 will be described in detail. The gripping device comprises a gripping member 420 (FIG. 24) slidably mounted on a rod 422 which is rigidly supported in the frame member 411 and extends laterally inwardly therefrom. The gripping member 420 is actuated by an air cylinder 423 whose piston rod 424 extends through an aperture 425 in the frame member 411 and is rigidly secured to the gripping member. A return spring 426 disposed between the piston 428 and the inner wall of the cylinder 423 serves to return the gripper member to retracted position. Rigidly attached to the lower end of the gripper member 420 is a generally T-shaped holder engaging latch element 430 adapted to fit within the recesses in the front and rear ends of the base of a blade holder 68. When air pressure is applied to the inlet 432 of the cylinder 423 the piston 428 will be forced inwardly and will displace the gripping member 420 to the dotted line position in FIG. 24 wherein it will engage the adjacent end of a blade holder disposed in front thereof. The other gripping device 419 is identically constructed but is, of course, faced in the opposite direction so as to cooperate with the gripping device 418 to grip the base of a holder securely therebetween.

The mechanism for rapidly displacing the carriage 410 from the solid line initial position to the dash-dot line terminal position of FIG. 25 comprises a movable rack 435, a fixed rack 436, and a movable pinion 437 in engagement with both racks and carried at the end of a piston rod 438 of an air cylinder 439 mounted beneath the support member 400 by means of brackets 440. The movable rack 435 is secured to the beam 416 of the carriage 410 and slidably extends through an opening in a bracket 442 (FIGS. 22 and 25) rigidly secured to the underside of the support member 400. The fixed rack 436 is rigidly mounted on a bracket 444 bolted to the underside of the support member 400.

The weight of the pinion 437 and the piston rod 438 is sustained by a carriage 446 (FIG. 26) that moves along a pair of spaced parallel runners 447 secured to the top surface of the support member 400 on each side of a long slot 448 in the support member. The carriage comprises a traverse bracket 449 and a pair of wheels 450 rotatably mounted on the bracket and arranged to roll on the runners 447. The pinion 437 is rotatably mounted on a headed spindle 452 which extends through the slot 448 in the support member 400 midway between the runners 447 and through a hole in the center of the traverse bracket 449 of the carriage 446. An adjusting nut 456 threaded on the upper end of the spindle 452 permits vertical adjustments of the pinion 437. The spindle 452 passes through a block 459 which is screwed to the end of the piston rod 438. The slot 448 in the supporting member 400 and the runners 447 extend therealong for a distance corresponding to the length of stroke of the cylinder 439.

The operation of the transfer unit 58 is initiated by a feeler switch 465 (FIGS. 22 and 23) mounted on a bracket 466 secured to the underside of the support member 400. The switch actuating feeler 467 is so disposed that it will be engaged by the upstanding bracket 72 of a holder carried along on the belt 54. The feeler 467 operates the switch 465 when a holder reaches a position between the two gripping devices 418 and 419 to energize a valve controlling circuit to be described in detail in connection with FIG. 16, which circuit opens the valves that control the flow of air from a source of compressed air to the rack actuating cylinder 439 and to the cylinders 423 of the gripping devices. This will cause the gripping members 420 to move inwardly and firmly grip the holder therebetween and after a short delay, the piston rod 439 and the pinion 437 connected thereto to move to the right as viewed in FIG. 25 thereby displacing the movable rack 435 and the carriage 410 attached thereto to the position of the carriage indicated in dot-dash lines. A time delay device sequentially closes the control valves and causes the gripping members to release the holder, and, momentarily later, to return the carriage to its starting position after a predetermined time sufficient to permit the carriage 410 to reach the dot-dash position. The movements of the carriage 410 are very rapid compared with the speed of the conveyors 54 and 60. The rate of travel of the conveyors may suitably to be in the order of 12 inches per minute while the carriage may transfer a holder from the discharge end of the heat treatment unit 56 to the inlet end of the cooling unit 62, a distance of more than 2 feet, in the order of one second. The holder deposited on the conveyor 60 will now be carried by the conveyor through the cooling unit 62.

A switch 470 (FIG. 22) is mounted on top of the support member 400 in a position wherein it will be operated by the pinion supporting carriage 446 when the piston reaches its position of rest and serves to reset the time delay device. The conveyor 60 carries the holder through the cooling unit 62 wherein the temperature of the blades and holder is reduced to a point where further heat treatment of the blade coating is arrested and the holder can be manually manipulated. The blade holders are deposited on a platform 64 where an operator transfers the blades to blade magazines for storage or for transfer to a packing or wrapping machines.

CONTROL CIRCUITS

The operation of the several units of the apparatus described above will be described with particular reference to the circuit diagram of FIGS. 16 and 27 wherein the various switches and the actuating elements therefor, and the control valves and devices operated therefrom, are schematically illustrated and designated with the same reference numbers as the corresponding elements referred to in the description of the apparatus.

The circuit diagram for the washer and dryer unit 23 is shown in FIG. 27 separate from and above that of the spraying unit 41 for the purpose of simplifying the description thereof although it should be obvious to those skilled in the art that various simplifications could readily be made in the circuits. Thus, although the washer and dryer unit control circuit is shown as being energized from a transformer 500 and the spraying unit control circuit is shown as being energized from a separate transformer 502, a single transformer and common feeder lines could be used.

The operation of the motor 366 of the spraying unit is controlled by a relay 504 whose energizing winding is connected to the source of power through a normally closed push-button stop switch 506 and a normally opened push-button start switch 508, the latter switch being shunted by a holding circuit 510 which includes a pair of contacts 511 of the relay. Other contacts of the relay 504 are connected between a source of three-phase A.C. power and the energizing windings of the drive motor 366.

Energization of the clutches 368 and 370 of the spraying unit drive and of the clutch 122 of the washer and dryer unit drive is controlled by a relay 512 which is connected to the source of power through a normally closed push-button stop switch 513, a normally closed jog switch 514 and a normally open push-button start switch 515. The start switch 515 is shunted by a holding circuit 516 which includes a pair of contacts 517 of the relay 512. A full-wave rectifier 518 supplies D.C. power to the clutches 368 and 370 and is energized through a pair of contacts 520 of the relay 512 and the positive terminal of the rectifier is connected to the movable contact of a relay 522 which contact is alternately enegageable with a back contact connected to the clutch 368 or a front contact connected to the clutch 370. The relay 522 is controlled by a switch 393 operated by a cam 390 as described above in connection with FIG. 21.

A relay 524 is provided for controlling the energization of a control valve 526 for the extractor 40, the clutch 122 of the motor 120 and the control valve 527 for the pusher 32 of the washer and dryer unit 23, and a relay 528 is provided for controlling the operation of a control valve 530 for the spraying unit pusher 57. The solenoid winding 532 of the control valve 526 is energized through a pair of contacts 534 of the relay 524, and the solenoid winding 536 of the control valve 530 is energized through a pair of contacts 538 of the relay 528.

The drive motor 120 of the washer and dryer unit (FIG. 3) is energized by a relay 550 whose energizing winding is connected to the line through a normally closed push-button stop switch 552, a normally open push-button start switch 554 and a normally closed safety switch 556 which will open if the liquid level in the still (not shown) for distilling the cleaning fluid for the washer section reaches an abnormally high level. The start switch 554 is shunted by a holding circuit 557 which includes a pair of contacts 558 of the relay 550 and a pair of contacts 560 of a relay 562 under the control of the shutdown switch 176 (FIG. 3) which is operated when the fluid level in the sump tank for the washing fluid reaches an abnormally high level.

A relay 564 is connected in parallel with the relay 550 through a switch 566 and controls the operation of the washing fluid feed pump of the washer section. The operation of the feed pump may be separately controlled by the switch 566.

A pair of relays 568 and 569 are provided for controlling the operation of the clutch 122 of the drive motor 120 of the washer and dryer unit, and are energized through a common circuit that includes a normally closed pushbutton stop switch 572, a normally closed jog switch 574 and a normally open pushbutton start switch 576, the start switch being shunted by a holding circuit 578 that includes a pair of contacts 579 of the relay 568. The energizing circuit for the clutch 122 of the washer-dryer drive may be traced from the positive terminal of a rectifier 581 through normally open contacts 580 of the relay 569, normally open contacts 582 of the relay 512 and normally open contacts 584 of the relay 524, the latter contacts being shunted by the back contacts 588 of a relay 586 the operation of which is controlled jointly by the pusher 32 and the chain conveyor 22 of the washer-dryer unit. Contacts 589 of the jog switch 574 are connected between the positive terminal of the rectifier 581 and the clutch 122 of the washer-dryer drive to permit momentary energization of the clutch 122 for adjusting and testing purposes.

The energizing circuit for the relay 586 and a relay 590 connected in parallel therewith includes the normally closed switch 190 which is operated by the pusher 32 of the washer-dryer unit (FIG. 2) and the switch 191 operated by the lug 128 carried by the conveyor chain 22 of the washer-dryer unit (FIG. 3). A pair of contacts 592 of the relay 590 are connected in a holding circuit 593 shunting the switch 191. A relay 594 controls the operation of the valve 596 for the torque motor 250 and the cylinder 254 of the blade-holder-tightening unit 34 (FIG. 15).

The relay 594 is energized through the back contact of the switch 190 and a holding circuit is established through a normally closed switch 597 of a timer 599 and the contacts 600 of the relay. The timer 599, which is energized through contacts 601 of the relay 594 opens the switch 597 after a predetermined time delay sufficient to enable the blade-holder-tightening unit 34 to complete its operation, in the present case about five seconds.

The actuating solenoid 602 of the valve 527 for the pusher 32 of the washer-dryer unit is controlled by a pair of contacts 606 of the relay 524 and a pair of contacts 608 of the relay 590.

The valves 150 to 153 described above in connection with the operation of the washer section (FIG. 3) are solenoid operated, the solenoids being connected to the source of power through the switches 163 to 166, respectively. The switches 163 to 166 are controlled by the cams 154 to 157, respectively, as described above in connection with FIG. 7. Since the cams 154 to 157 are disposed on the cam shaft 126 successively 45 radial degrees apart, cam 154 will close the switch 163 45 degrees before the cam 155 will close the switch 164 and so on down the line. The sequential operation of the switches 163 to 166 will cause corresponding operation of the valves 150 to 153 so that valve 150 is first energized to direct cleaning fluid to nozzles 1 and 9, valve 151 is then energized when the came shaft 126 has advanced 45 degrees to direct cleaning fluid to nozzles 2 and 10 and so forth until fluid is simultaneously directed to nozzles 1 to 4 and 9 to 13 when all the valves are energized.

The circuit for controlling the operation of the sump pump of the washer section 24 as described above in connection with FIG. 3 is preferably operated at a lower voltage and to this end a step-down transformer 620 provides the source of power for a relay 622 that controls the operation of the sump pump. The relay 622 is operated by the high limit switch 170 which is actuated by the magnetic float 178 in the stand pipe 174 when the float reaches the level of this switch thus completing a circuit from one side of the transformer 620 through the switch 170 and the energizing windings of the relay 622 back to the other side of the transformer. The relay 622 will, when energized, close contacts 626 to energize the sump pump motor and establish a holding circuit through the relay contacts 628 and the normally closed low level limit switch 172. Thus, after the relay 622 has been operated by the closing of the high limit switch 170 the relay will remain operated through its holding circuit until the float 178 drops to the level of the low limit switch 172 to open this switch and hence interrupt the holding circuit to cause the relay 622 to open and stop the sump pump. The danger level switch 176 is connected in circuit with the energizing winding of the relay 562 and serves to open the normally closed contacts 560 in the holding circuit of the relays 550 and 564 that control the operation of the main drive motor 120 and the feed pump of the washer-dryer unit to interrupt this holding circuit and thus causing the entire washer-dryer unit to shut down when the level in the sump reaches an abnormally high level.

Figure 28:
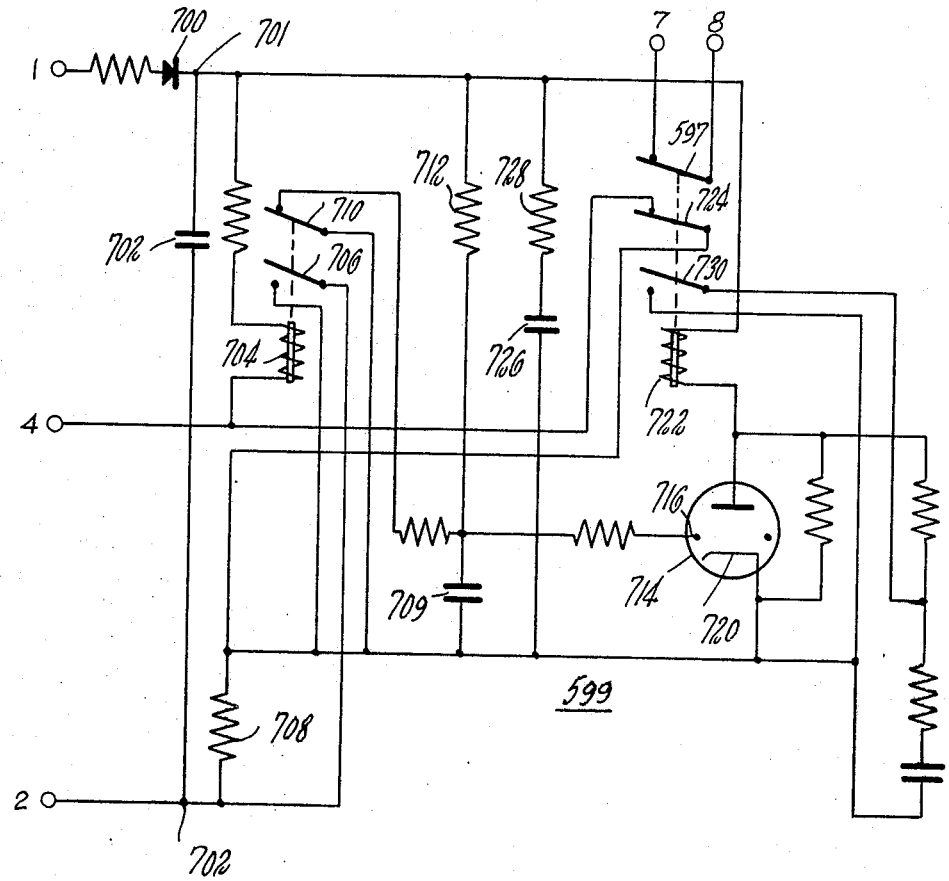
FIG. 28 is a circuit diagram of a timer shown as a block in FIG. 27.

Various types of delay circuits or timers are known and available on the market suitable for the purposes of the timer 599 to provide the delayed deenergization of the relay 594 and type CK Electronic Timer Model 120 manufactured by Farmer Electric Product Company, Inc., Newton, Lower Falls, Mass., may be used. A circuit diagram of such a timer is shown in FIG. 28. A rectifier 700 furnishes direct current to the timing circuit across the terminals 701 and 702 of the circuit. The operation of the timer is initiated by momentarily connecting terminal 4 to the terminal 2 to energize a relay 704 which establishes a holding circuit through its relay contacts 706 which shunts the current limiting resistor 708. The resistor 708 connected in series with the energizing winding of the relay is of sufficiently high impedance to prevent the operation of the relay. The energized relay 704 will also open a shunt circuit for the charging capacitor 709 which circuit includes the normally closed relay contacts 710 to permit the capacitor to be charged through a current limiting resistor 712. After a predetermined time delay determined by the capacitance of the capacitor 709 and the resistance of the resistor 712 as well as the firing potential of a gas discharge tube 712, the starting electrode 716 connected to the positive terminal of the capacitor 709 will reach a voltage sufficient to cause a discharge between it and the cathode 720 to cause the tube to fire and energize a relay 722. The energization of the relay 722 will open relay contacts 724 to interrupt the holding circuit for the relay 704 thus causing the latter to open and thereby again establish the shunt circuit for the capacitor 709 through the relay contacts 710 to discharge the capacitor and extinguish the tube 714. Tube 714 may suitably be a cold cathode trigger tube type 5823.

A charge built up on a capacitor 726 discharges through a resistor 728, through the energizing winding of the relay 722 and through a shunting path for the tube 714 established by the closed contacts 730 of the relay and maintains the relay 722 energized for a sufficient length of time to permit the circuit controlled by the normally closed timer switch 597 to operate before this switch is reclosed.

The control circuit for the holder transfer unit 58 (FIGS. 22 to 26) is shown in FIG. 16. A timer motor 730 drives a cam shaft 732 that carries cams 734, 735, and 736. The cam 735 controls the operation of a switch 738 connected in circuit with the solenoid winding 740 of a valve 742 that controls the operation of the holder gripping devices 418 and 419. The cam 736 controls the operation of a switch 744 connected in circuit with the solenoid winding 746 of a valve 748 that controls the operation of the carriage displacing cylinder 439.

The motor 730 is energized through a switch 750 operated by a solenoid 752 whose energizing winding is in circuit with the reset switch 470 and the holder sensing switch 465. The cam 734 serves to maintain the switch 750 closed after momentary energization of the solenoid 752, by means of a follower received within a notch 756 in the cam 734 when in home position.

With the carriage 446 in its position of rest maintaining the switch 470 closed, a holder 68 will, when it reaches a position between the gripping devices 418 and 419, deflect the feeler 467 to close the switch 465 to energize the solenoid 752. The solenoid 752 closes the switch 750 to start the motor 730 and withdraws the follower 754 from the notch 756 in the cam 734 to free the latter and the cam shaft 732 for rotation. The cam follower 754 will ride on the high portion of the cam 734 to maintain the switch 750 closed after the switches 470 and 465 are opened when the carriage 410 moves away from its position of rest. A succeeding holder 68 moved into position to reclose the switch 465 before the completion of a cycle of operation of the transfer mechanism will not cause energization of the solenoid 752 until the transfer mechanism has returned to its initial position to reclose the switch 470.

The cam 735 closes the switch 738 a couple of seconds before the cam 736 closes the switch 744 to ensure that the holder 68 is securely gripped between the gripping elements 418 and 419 before movement of the transfer carriage 410 is initiated.

The cam 735 is designed so as to open the switch 738 and close the valve 742 to release the gripping elements 418 and 419 after the cylinder 439 has reached the forward end of its stroke and the cam 736 is designed to open the switch 744 momentarily thereafter, to close the valve 748 and cause the cylinder to return the carriage 410 to its initial position.

OPERATION

The washer-dryer unit is prepared for operation by momentarily depressing the starter button 554 (FIG. 27) to energize the motor control relay 550 which establishes the holding circuit 557 through its contacts 558, and the washing fluid pump control relay 564. This will energize the drive motor 120 and the feed pump of the washer-dryer unit. The drive motor 366 for the spraying unit 41 is started by momentarily depressing starter button 508 to energize the relay 504 which remains energized through the holding circuit 510 after the switch 508 is again released. The power source for the clutches 368 and 370 for connecting the spray booth drive motor 366 to the conveyor chain 44 of the spraying unit is energized by momentarily depressing pushbutton switch 515 which closes the energizing circuit for the relay 512 which remains energized through the holding circuit 516 after the pushbutton is again released. The relay 512 will energize the full wave rectifier 518 through contacts 520 which connect the rectifier to the power line, the rectifier being connected in circuit either with the high speed clutch 368 or the low speed clutch 370, depending on the position of the cam 390, through the relay contacts 521 of the relay 522. The relay 522 is energized and deenergized through the operation of the switch 393 controlled by the cam 390.

Cam 391, driven in synchronism with the cam 390 from the drive motor 366, closes the switch 394 when a pusher lug 306 on the conveyor chain 44 has just cleared the extractor 40 to energize the relay 524 which in turn energizes the operating solenoid 532 of the control valve 526 for the extractor to cause the latter to reach into the end of the preheater 38 to engage and extract a blade holder therefrom. The energization of the relay 524 also closes relay contacts 584 to complete the energizing circuit for the clutch 122 of the drive motor 120 of the washer-dryer unit. This circuit may be traced from the positive terminal of the rectifier 581 through the closed relay contacts 580 of the relay 569, the closed relay contacts 582 of the relay 512, the relay contacts 584 of the relay 524, and the clutch 122 of the washer-dryer motor to the negative terminal of the rectifier. The actuated clutch 122 will connect the motor 120 to the conveyor chain 22 and cause the latter to move away from the position in which its pusher lug 128 will maintain the switch 191 in a closed position. Energization of the relay 524 further closes relay contacts 606 to complete the energizing circuit of the solenoid 602 of the control valve 527 for the pusher 32 of the washer-dryer unit, which circuit includes contacts 608 of the relay 590. When the pusher 32 of the washer-dryer unit reaches its maximum forward position it will trip the switch 190 to deenergize the relays 586 and 590 which were energized during this period through the closed switch 190 and the holding circuit 593 of the relay 590, the conveyor chain 116 of the washer-dryer unit having by this time moved away from the switch 191 to permit the latter to open. Deenergization of the relay 590 will interrupt the holding circuit 593 and the deenergization of the relay 586 will permit the switch contacts 588 to close and establish a shunt circuit for the switch contacts 584 of the relay 524 so as to cause the clutch 122 to remain energized after relay 524 is deenergized by the operation of the cam 391, until the chain 22 again closes the switch 191.

When the pusher 32 of the washer-dryer unit operates the switch 190 at its extended position it will cause the relay 594 to be energized through the back contacts of the switch 190 and the relay will remain closed through a holding circuit that includes the normally closed switch 597 of the timer unit 599 and the relay contacts 600. The operation of the relay 594 will close an energizing circuit to the solenoid 595 of the valve 596 that controls the operation of the spin motor 250 and the carriage 240 of the blade holder tightening unit 34 to cause the carriage 240 of the unit to advance toward the blade holder placed in position in front thereof by the pusher unit 32 and the spin motor to engage the tightening nut 89 of the blade holder 68 and apply tightening pressure to the blade stack. After predetermined time, in the present apparatus, conveniently set at four seconds, the timer 599 will momentarily open the switch 597 to interrupt the holding circuit of the relay 594 thus causing the latter to open. The timer switch 597 is reclosed approximately 60 milliseconds later but by this time the holding contacts 600 have opened and the relay 594 remains deenergized and prepared for another cycle of operation.

When the pusher 32 operates the switch 190 it interrupts the energizing circuit for the relay 590 to open the energizing circuit for the solenoid of the pusher control valve 527 causing the pusher to return to its initial position and return switch 190 to its front position. Deenergization of the relay 590 interrupts the holding circuit 593 so that this relay will remain deenergized after the switch 190 is returned to its front position and until the next pusher lug 128 on the conveyor chain 22 recloses the switch 191. Reclosing of the switch 191 causes the relay 586 to operate and open contacts 588 to deenergize the clutch 122 and stop the conveyor chain 22 so that the switch 191 will remain closed and the clutch 122 will remain deenergized until another cycle of operation of the washer-dryer unit is initiated by the extractor actuating cam 391 of the spraying unit.

The control valve 530 for the pusher 57 of the spraying unit is operated in timed relation with the conveyor chain 44 by the cam 392 which controls the operation of the switch 395 in the energizing circuit of the relay 528 which in turn controls the energization of the solenoid 536 of this valve through its contacts 538. The valve 530 is operated immediately after a holder is pushed onto the platform 50 and in front of the pusher 57 by the conveyor chain 44.

The jog switch 514 permits momentary operation of the conveyor chain 44 and the cams 590, 591 and 592 which are operated in timed relationship therewith as described above for the purpose of checking and adjusting the various units of the spraying unit. Similarly, the washer-dryer circuit is provided with a jog switch 574 that permits momentary energization of the clutch 122 of the washer-dryer-motor independently of the relays 512 and 524 to permit the checking and adjusting of the equipment driven therefrom or operated in conjunction therewith.

What we claim as new and desire to secure by Letters Patent of the United States is:

1. Razor blade treatment apparatus comprising a coating application zone, continuously operating endless conveyor means including means at equally spaced intervals therealong for engaging a razor blade holder to transport said holder to, through and beyond said application zone, variable speed drive means for said conveyor means, and control means synchronized with movements of said conveyor means to reduce the speed of said drive means when said conveyor means arrives in a position wherein a holder in engagement with one of said holder engaging means just enters said application zone and drives said conveyor means at a constant relatively slow speed and to increase the speed of said drive means when said holder just leaves said application zone and drives said conveyor means at a constant relatively high speed 2. Razor blade treatment apparatus comprising a blade edge treatment zone, endless conveyor means including at spaced intervals therealong means for engaging a razor blade holder to transport the holder to, through and beyond said treatment zone, means for placing a holder in position to be engaged by one of said holder engaging means, receiving means for receiving said holder from said conveyor means beyond said treatment zone, transfer means to remove said holder from said receiving means, two-speed drive means for said conveyor means, and control means synchronized with movements of said conveyor means to shift said drive means to low constant speed when said conveyor means arrives in a position wherein a holder transported thereby just enters said treatment zone and to shift said drive means to high constant speed when said holder just leaves said treatment zone, to actuate said holder placing means to place a holder between two adjacent holder engaging means to be engaged by the trailing one, and to actuate siad transfer means to remove a holder from said receiving means.

3. In combination, a holder including means loosely supporting a plurality of blades with the blade edges approximately parallel and exposed and means for clamping the blades together into a compact stack in said holder, a clamping means tightening unit, a cleaning unit, a pretreatment unit, a blade treatment unit, a post-treatment unit, and holder manipulating means including conveyor means and transfer means for transporting a holder with the blades loosely held therein through said cleaning unit and positioning it in front of said tightening unit to clamp the blades firmly together on actuation of said tightening unit, and for transporting said holder successively from said tightening unit through said pretreatment unit, said treatment unit and said post-treatment unit.

4. In combination, a blade holder including means supporting a stack of razor blades with the cutting edges thereof exposed and permitting limited relative movements between individual blades, blade cleaning means including spraying means emitting a stream of cleaning fluid and drying means emitting a stream of gaseous fluid, means to engage and transport a holder through said cleaning means, said streams of cleaning fluid and gaseous fluid being sufficiently concentrated and forceful to riffle the blades in the stack under impingement thereof as said holder is transported therethrough, said holder including means operative to clamp the blades in the stack firmly together, tightening means for said clamping means, transfer means including an extensible member for transferring said holder from said transporting means to said tightening means, and means operable by said extensible member to initiate operation of said tightening means to clamp said blades together 5. Apparatus for treating the cuting edges of blades comprising a holder including means loosely supporting a stack of blades with the blade edges approximately parallel and exposed while permitting limited relative movement between individual blades, means for clamping the blades together in a compact stack in said holder so that their faces are in firm abutting relation, a blade cleaning unit, a clamping means actuating unit, a blade edge treatment unit, and holder manipulating means including conveyor means for transporting said holder with the blades loosely held therein through said cleaning unit, for operating said clamping means actuating unit to clamp the blades firmly together after said holder has passed through said cleaning unit, and for transporting said holder through said treatment unit with the blades clamped together in a compact stack in said holder so that only the blade edges are treated in said treatment unit.

6. The apparatus as claimed in claim 5 and further including variable speed drive means for said conveyor means, and control means synchronized with said conveyor means for reducing the speed of said drive means when said conveyor means arrives at a position wherein at least a portion of the holder is adjacent said treatment unit for driving said conveyor means at a constant relatively slow speed to move said holder past said treatment unit and for subsequently increasing the speed of said drive means.

7. The apparatus as claimed in claim 5 wherein said cleaning unit includes means for directing cleaning fluid in a direction generally perpendicular to the blade edges towards the body of the blade with sufficient force to riffle said blades and for directing a cleaning fluid removing agent across the blade edges in a direction away from the body of the blades to remove cleaning fluid from said blades.

8. Apparatus for treating the cutting edges of blades comprising a holder including means loosely supporting a stack of blades with the blade edges approximately parallel and exposed while permitting limited relative movement between individual blades, means for clamping the blades together in a compact stack in said holder so that their faces are in firm abutting relation, a blade celaning unit, a blade edge treatment unit, and apparatus responsive to movement of the blade holder from said cleaning unit to said treatment unit to actuate said clamping means to clamp the stack of loosely held blades firmly together with their faces in abutting relation.

9. In combination, a razor blade holder, a holder receiving station, holder supply conveyor means, drive means for intermittently driving said conveyor means operable when actuated to advance the latter to deposit a holder on said receiving station and then stop, a pretreatment zone including continuously operating conveyor means, holder transfer means at said receiving station operable to transfer a holder to said pretreatment zone conveyor means, a blade edge treatment zone including continuously operating conveyor means extending through said blade edge treatment zone, holder extractor means, and control means synchronized with said treatment zone conveyor means to actuate said holder extracting means to extract a holder from said pretreatment zone conveyor, to actuate said transfer means to transfer a holder to said pretreatment conveyor means, and to actuate said drive means to advance said holder supply conveyor means to deposit another holder on said receiving station.

10. Apparatus for coating the cutting edges of razor blades comprising a holder including means for releasably clamping a plurality of blades in a stack with the edges thereof exposed and in an approximately parallel relation, means for preheating the holder and a stack of blades supported thereon, coating means for applying a coating of a material curable to a state that improves the shaving characteristics of the blades, conveyor means for transporting said holder successively through said preheating means, and said coating means, variable speed drive means for said coating means conveyor means, and control means synchronized with said last named conveyor means for reducing the speed of said drive means when said conveyor means arrives at a position wherein at least a portion of the holder is adjacent said coating means for driving said conveyor means at a constant relatively slow speed to move said holder past said coating means and for subsequently increasing the speed of said drive means.

11. In combination, blade holding means for loosely holding a stack of blades having cutting edges with the edges in approximately parallel relation and vertically disposed, a blade cleaning unit including conveyor means for carrying said blade holding means through said unit and spraying means for spraying cleaning fluid onto said edges of said blades as said blade holder is carried therethrough, said blade holding means including blade clamping means for clamping said blades together, means for tightening said clamping means, means for transferring said blade holder from said cleaning unit to said blade tightening means, means actuated by said transfer means to operate said tightening means, a preheat unit including conveyor means for transporting a blade holder through said preheat unit, a blade edge coating unit, conveyor means for transporting a blade holder through said coating unit while said coating unit applies a thin coating of curable material to said blade edges, a curing unit including conveyor means for transporting a blade holder through said curing unit, a cooling unit for arresting the curing of said material including conveyor means for transporting a blade holder through said cooling unit, and means for transferring a blade holder from each of said conveyor means to the next conveyor means.

12. Blade cleaning and drying apparatus comprising two parallel banks of spraying nozzles, a source of cleaning fluid under pressure connected to said nozzle, a gaseous fluid nozzle, a source of heated air connected to said gaseous fluid nozzle, a holder including a spindle for holding a stack of razor blades loosely and slidably thereon, conveyor means for successively transporting said holder past said spraying nozzles and said gaseous fluid nozzle, the spray emanating from said spray nozzle and the gaseous fluid emanating from said gaseous fluid nozzle being directed against the edges of the blades with sufficient force and sufficiently concentrated to cause the blades loosely held in said holder to riffle as they are transported past said nozzles.

13. Razor blade cleaning and drying apparatus comprising spray means emitting a spray of cleaning fluid, means for producing a stream of gaseous fluid, a blade holder including means for holding a stack of blades permitting relative displacement of the blades, conveyor means transporting said holder and blades through said spray of cleaning fluid and through said stream of gaseous fluid, said spray of cleaning fluid and stream of gaseous fluid being sufficiently forceful to riffle the blades as the holder is moved therethrough, and means resiliently engaging a nonsharpened portion of the blades to push the blades to the rear of the holder as the holder is moved therepast prior to entering the stream of gaseous fluid.

14. Apparatus for treating the cutting edges of razor blades comprising a holder including means for loosely confining a plurality of blades in a stack with the edges of the blades in parallel relation, washing means including a plurality of pairs of opposed spray nozzles. drying means including a gaseous fluid nozzle, and exhaust means, said holder including blade clamping means, means for tightening said blade clamping means to securely clamp the blades together, means for preheating the holder and blades held therein, means for coating the edges of the blades, heat treatment means for heat treating the coating, cooling means for cooling the holder and blades to arrest further heat treatment of the coating, and conveyor means including transfer means for successively transporting a holder through said washing means, said drying means to said tightening means, from said tightening means through said preheating means, said coating means, said heat treatment means, and said cooling means.

15. Blade cleaning apparatus in accordance with claim 14 wherein said nozzles are uniformly spaced and said blade stack spans a plurality of nozzles whereby said stack of blades is simultaneously and continuously subjected to spray from such plurality of nozzles as it is transported past said row of nozzles.

16. Blade cleaning apparatus comprising a blade holder including razor blade supporting means slidably holding a plurality of razor blades in stack fashion and end stop means spaced apart by a distance greater than the length of the stack of blades, cleaning fluid spray means, gaseous fluid blowing means connected to a source of heated gaseous fluid under pressure, conveyor means for transporting said holder and blades carried thereby through said cleaning fluid spraying means and said gaseous fluid blowing means, said spraying means emitting a stream of cleaning fluid on the blade edges sufficiently forceful to riffle the blades in the stack as the holder is transported therepast, said gaseous fluid blowing means emitting a stream of geasous fluid directed on a non-sharpened portion of said blades as said holder is moved therepast and resilient means intermediate said spray means and said gaseous fluid blowing means engaging an unsharpened portion of the foremost blade and compacting the stack of blades against the trailing end stop means.

17. In combination, a holder including means loosely supporting a plurality of blades with the blade edges approximately parallel and exposed and means for clamping the blades together into a compact stack in said holder, a clamping means tightening unit, a cleaning unit, a pretreatment unit, a blade treatment unit, and holder manipulating means including conveyor means and transfer means for transporting a holder with the blades loosely held therein through said cleaning unit and positioning it in front of said tightening unit to clamp the blades firmly together on actuation of said tightening unit, and for transporting said holder successively, from said tightening unit through said pretreatment unit, and said treatment unit.

18. Apparatus for coating the cutting edges of perforated razor blades comprising a holder including means for extending through the perforations of a plurality of blades to support them loosely in a stack with the edges thereof in approximately parallel relation, spray means for washing the blades while loosely held in the holder, means for releasably clamping the blades together in the stack, means for preheating the holder and a stack of blades contained therein in clamped relation, coating means applying a coating of heat-curable material on the blade edges, and conveyor means for transporting a holder successively through said washing means, said clamping means, said preheating means, and said coating means.

19. In combination, blade holding means for loosely holding a stack of blades having cutting edges with the edges in approximately parallel relation and vertically disposed, a blade cleaning unit including conveyor means for carrying said blade holding means through said unit and spraying means for spraying cleaning fluid onto said edges of said blades as said blade holder is carried therethrough, said blade holding means including blade clamping means for clamping said blades together, means for tightening said clamping means, means for transferring said blade holder from said cleaning unit to said blade tightening means, means actuated by said transfer means to operate said tightening means, a preheat unit including conveyor means for transporting a blade holder through said preheat unit, a blade edge coating unit, conveyor means for transporting a blade holder through said coating unit while said coating unit applies a thin coating of curable material to said blade edges, a curing unit including conveyor means for transporting a blade holder through said curing unit, a cooling unit for arresting the curing of said material including conveyor means for transporting a blade holder through said cooling unit, and means for transferring a blade holder from said conveyor means for said preheat unit to said conveyor means for said coating unit.

20. Apparatus for treating the cutting edges of razor blades comprising a holder including means for loosely confining a plurality of blades in a stack with the edges of the blades in parallel relation, washing means including a plurality of pairs of opposed spray nozzles, drying means including a gaseous fluid nozzle, and exhaust means, said holder including blade clamping means, means for tightening said blade clamping means to securely clamp the blades together, means for preheating the holder and blades held therein, means for coating the edges of the blades, heat treatment means for heat treating the coating, cooling means for cooling the holder and blades to arrest further heat treatment of the coating, and conveyor means including transfer means for successively transporting a holder through said washing means, said drying means to said tightening means, from said tightening means through said preheating means, and said coating means, said means for transferring said holder from said drying means to said tightening means actuating said tightening means.

References Cited

UNITED STATES PATENTS

| | | | |
|---|---|---|---|
| 1,512,918 | 10/1924 | Forsgard | 134—72 |
| 1,710,953 | 4/1929 | Sullivan | 118—64 |
| 1,827,871 | 10/1937 | Frost | 30—346.53 |
| 2,378,758 | 6/1945 | Ekstrom | 118—66 |
| 2,421,343 | 5/1947 | Mageoch | 118—324 X |
| 2,779,690 | 1/1957 | Gaiser | 117—105.3 X |
| 2,811,130 | 10/1957 | Friderici | 118—2 |
| 2,937,976 | 5/1960 | Granahan et al. | 167—85 |
| 2,728,686 | 12/1955 | Borushko | 117—49 |
| 2,853,400 | 9/1958 | Ahlbin | 117—49 |
| 2,811,132 | 10/1957 | Ahlbin | 118—58 |
| 2,960,061 | 11/1960 | Whitbecy | 118—58 |
| 1,666,044 | 4/1928 | Danziger | 118—500 |
| 2,977,930 | 4/1961 | Grimone | 118—500 |

WALTER A. SCHEEL, Primary Examiner

J. P. McINTOSH, Assistant Examiner

U.S. Cl. X.R.

15—306; 118—7, 62, 66, 73, 314, 324, 503; 134—48, 72; 269—47